US012812439B2

(12) United States Patent
Ren et al.

(10) Patent No.: US 12,812,439 B2
(45) Date of Patent: Nov. 24, 2026

(54) ENHANCEMENT OF CROSS-LINK INTERFERENCE MANAGEMENT

(71) Applicant: QUALCOMM Incorporated, San Diego, CA (US)

(72) Inventors: Yuwei Ren, Beijing (CN); Weimin Duan, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/729,642

(22) PCT Filed: Mar. 30, 2022

(86) PCT No.: PCT/CN2022/083985

§ 371 (c)(1),
(2) Date: Jul. 17, 2024

(87) PCT Pub. No.: WO2023/184211

PCT Pub. Date: Oct. 5, 2023

(65) Prior Publication Data

US 2025/0234230 A1 Jul. 17, 2025

(51) Int. Cl.
*H04W 24/10* (2009.01)
*H04W 72/541* (2023.01)

(52) U.S. Cl.
CPC ......... *H04W 24/10* (2013.01); *H04W 72/541* (2023.01)

(58) Field of Classification Search
CPC ............... H04W 24/10; H04W 72/541; H04W 24/08; H04W 72/25; H04W 92/18
See application file for complete search history.

(56) References Cited

U.S. PATENT DOCUMENTS

2020/0351690 A1* 11/2020 Zhu ........................ H04W 24/10
2022/0014954 A1 1/2022 Ibrahim et al.
(Continued)

FOREIGN PATENT DOCUMENTS

WO 2020164500 A1 8/2020
WO 2021226824 A1 11/2021
WO 2022021362 A1 2/2022

OTHER PUBLICATIONS

Lee, Jaewon, Minjoong Rim, and Chung G. Kang. "Decentralized slot-ordered cross link interference control scheme for dynamic time division duplexing (TDD) in 5G cellular system." IEEE Access 9 (2021): 63567-63579. (Year: 2021).*
(Continued)

*Primary Examiner* — Sharad Rampuria
(74) *Attorney, Agent, or Firm* — Dinsmore & Shohl LLP

(57) ABSTRACT

Certain aspects of the present disclosure provide a method for wireless communication by a network entity. The method generally includes transmitting first information configuring a first user equipment (UE) to transmit cross-link interference (CLI) measurement reports indicating (CLI) associated with at least one (CLI) resource assigned to a second UE, transmitting second information configuring the second UE to vary signal transmission on the at least one (CLI) resource, and determining, based on one or more (CLI) measurement reports received from the first UE, that a third UE is transmitting on the at least one (CLI) resource.

25 Claims, 26 Drawing Sheets

(56) References Cited

U.S. PATENT DOCUMENTS

| | | | | |
|---|---|---|---|---|
| 2023/0180076 A1* | 6/2023 | Paladugu .......... | H04W 36/0058 370/331 |
| 2025/0133615 A1* | 4/2025 | Back ..................... | H04W 88/04 |

OTHER PUBLICATIONS

Huawei et al., "UE-To-UE Measurement for Cross-Link Interference Mitigation", 3GPP TSG RAN WG1 Ad Hoc Meeting, R1-1800051, No. Vancouver, Canada, Jan. 22, 2018-Jan. 26, 2018, 13 Pages, Jan. 26, 2018.

International Search Report and Written Opinion—PCT/CN2022/083985—ISA/EPO—Nov. 30, 2022.

Nokia et al., "Remaining Issues on UE CLI Measurements", 3GPP TSG-RAN2#109e, R2-2000555, No. Elbonia, Feb. 24, 2020-Mar. 6, 2020, 8 Pages, Mar. 6, 2020.

* cited by examiner

1000

ENHANCEMENT OF CROSS-LINK INTERFERENCE MANAGEMENT

CROSS-REFERENCE TO RELATED APPLICATIONS

This application is a national stage application under 35 U.S.C. 371 of PCT/CN2022/083985, filed Mar. 30, 2022, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for detecting a wireless device is transmitting on measurement resources assigned to another wireless device.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a network entity. The method includes transmitting first information configuring a first user equipment (UE) to transmit cross-link interference (CLI) measurement reports indicating CLI associated with at least one CLI resource assigned to a second UE; transmitting second information configuring the second UE to vary signal transmission on the at least one CLI resource; and determining, based on one or more CLI measurement reports received from the first UE, that a third UE is transmitting on the at least one CLI resource.

Another aspect provides a method of wireless communications by a first UE. The method includes receiving, from a network entity, first information configuring the first UE to transmit CLI measurement reports indicating CLI associated with at least one CLI resource assigned to a second UE; receiving, from the network entity, second information indicating how the second UE is to vary signal transmission on the at least one CLI resource; determining, based on one or more CLI measurement taken on the at least one CLI resource, that a third UE is transmitting on the at least one CLI resource; and transmitting, to the network entity, a report indicating the determination.

Another aspect provides a method of wireless communications by a network entity. The method includes transmitting a first set of information configuring a first UE with time and frequency resources for at least one CLI resource; transmitting a second set of information configuring the first UE with sufficient information to decode signals transmitted by a second UE on the at least one CLI resource; and receiving one or more CLI measurement reports from the first UE indicating CLI measurements associated with the at least one CLI resource.

Another aspect provides a method of wireless communications by a first UE. The method includes receiving, from a network entity, a first set of information configuring a first UE with time and frequency resources for at least one CLI resource; receiving signals transmitted by the second UE on the at least one CLI resource; receiving, from the network entity, a second set of information; decoding the signals using the second information; and transmitting, to the network entity, one or more CLI measurement reports indicating CLI measurements associated with the decoded signals.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
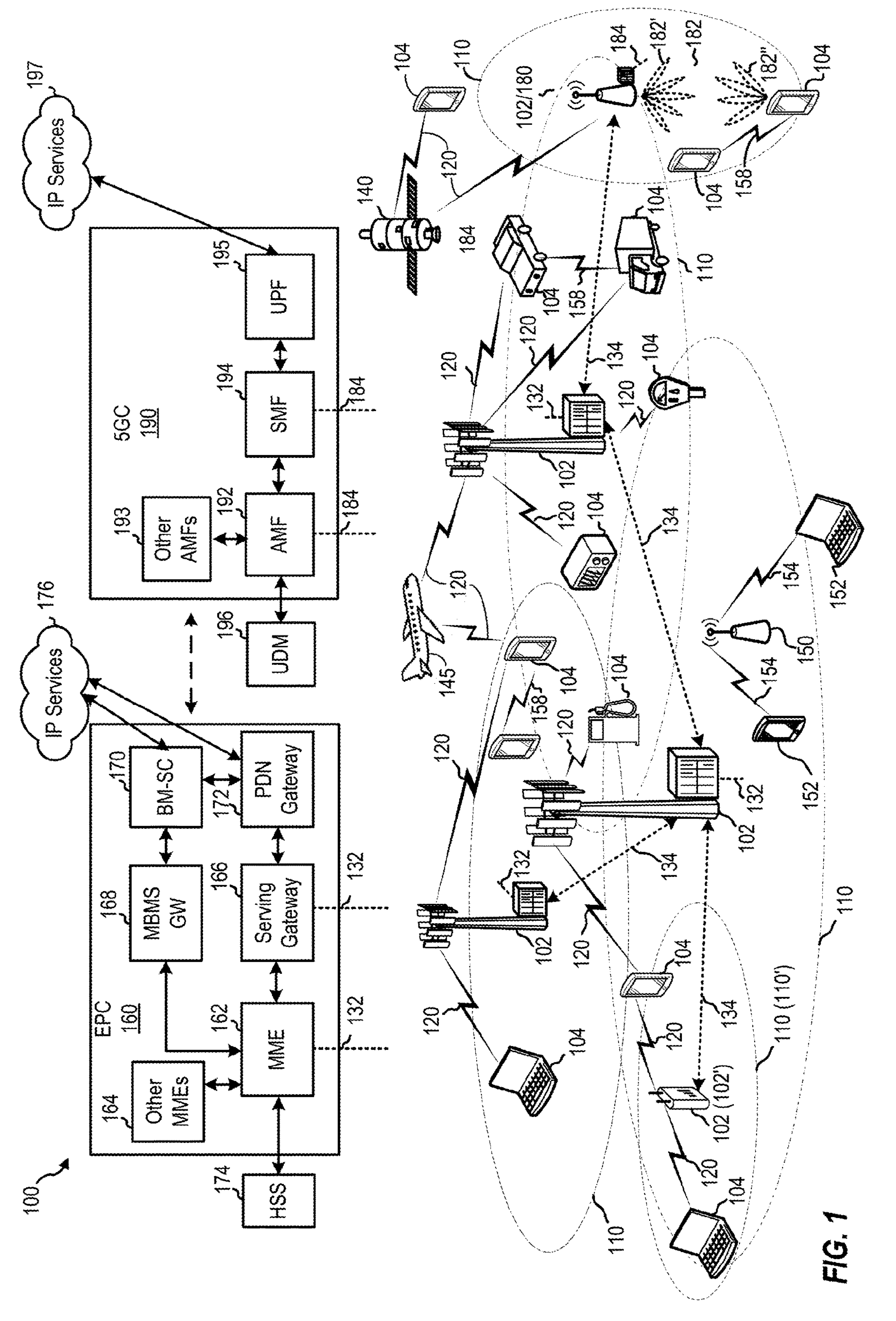
FIG. 1 depicts an example wireless communications network.

Aspects of the present disclosure provide apparatuses, methods, processing systems, and computer-readable mediums for detecting a wireless device is transmitting on measurement resources assigned to another wireless device.

The aspects described herein may help protect procedures designed to detect and mitigate cross link interference (CLI), for example, when a receiving network entity and a transmitting network entity communicate in a full duplex (FD) mode of communication. During FD communications, uplink (UL) and downlink (DL) transmissions may be performed simultaneously.

CLI may occur when a network entity configures different time division duplexed (TDD) uplink (UL) and downlink (DL) slot formats to nearby user equipments (UEs). CLI can occur between two UEs on the same cell or between two UEs on different cells. When a UE (e.g., referred to as an aggressor) is transmitting, another UE (e.g., referred to as a victim) may observe this transmission as CLI in its DL symbols if aggressor UE's UL symbol collides with at least one DL symbol of victim UE.

To detect CLI, a network may configure CLI resources for one or more victim UEs to measure while one or more potential aggressor UEs transmit. The victim UE may measure and report interference metrics, such as reference signal received power (RSRP) and/or reference signal strength indicator (RSSI) in the configured CLI resources. Based on reported CLI metrics, the network may determine which UE(s) are victims and aggressors and may schedule accordingly to try and mitigate CLI.

Unfortunately, a victim UE may act as a hostile UE by acting as a fake aggressor. For example, a hostile UE acting as a fake aggressor may transmit a large power transmission toward a real victim UE on CLI resources assigned to a potential aggressor UE. In some situations, the hostile UE may receive the CLI resource configuration information from the network, and may transmit the large power transmission in a selected CLI resource (e.g., a CLI resource assigned to the potential aggressor UE) as part of an attack. The real victim UE may measure and report a large interference because of the transmission by the hostile UE, so the network may incorrectly determine the potential aggressor UE (assigned the selected CLI resources) is a real aggressor causing the interference. As a result, the network may unnecessarily take action, such as limiting transmission power to the potential aggressor or limiting scheduling transmissions from the potential aggressor UE.

As used herein, a "potential victim UE" is a victim UE which is measuring CLI, but has not yet determined that CLI is present. Similarly, a "potential aggressor UE" is a UE which has been assigned resources for transmission, but has not yet sent a transmission and/or the transmission did not result in CLI. As used herein, a "real victim UE" is a victim UE which has actually determined that CLI is present. Similarly, a "real aggressor UE" is a UE that has transmitted (e.g., and actually created CLI). As used herein, a "hostile UE" is a victim UE which acts as a fake aggressor UE by transmitting in CLI resources assigned to a potential aggressor UE. On the other hand, a "legitimate UE" or a "legitimate victim UE" is a UE which the network has confirmed is not a hostile UE.

Aspects of the present disclosure provide techniques that may help detect a hostile UE acting as a fake aggressor. As a result, overall system performance may be improved as incorrect identification of aggressor UEs may be avoided.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
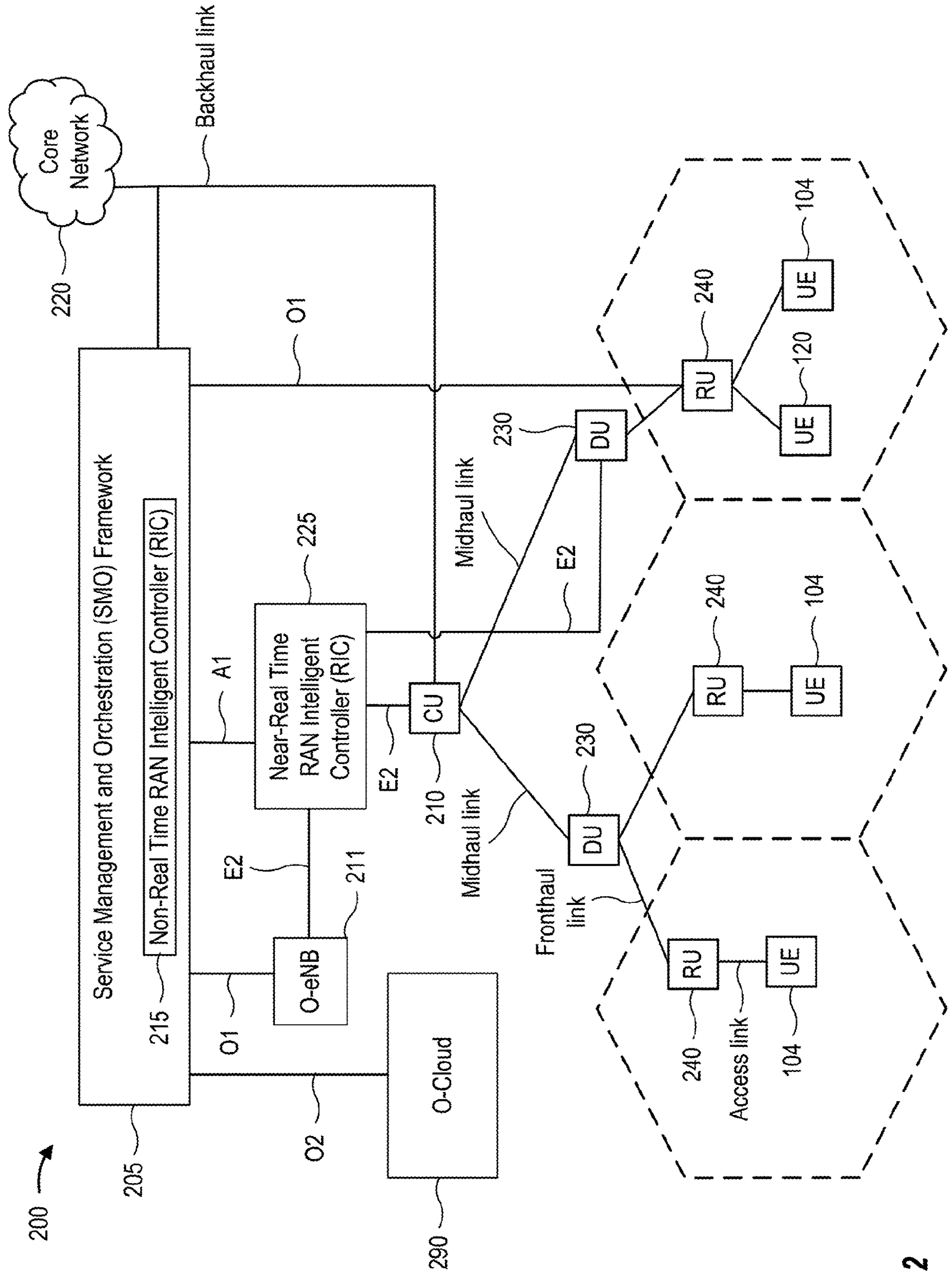
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as “Sub-6 GHz”. Similarly, 3GPP currently defines Frequency Range 2 (FR2) as including 24,250 MHz-52,600 MHZ, which is sometimes referred to (interchangeably) as a “millimeter wave” (“mmW” or “mmWave”). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
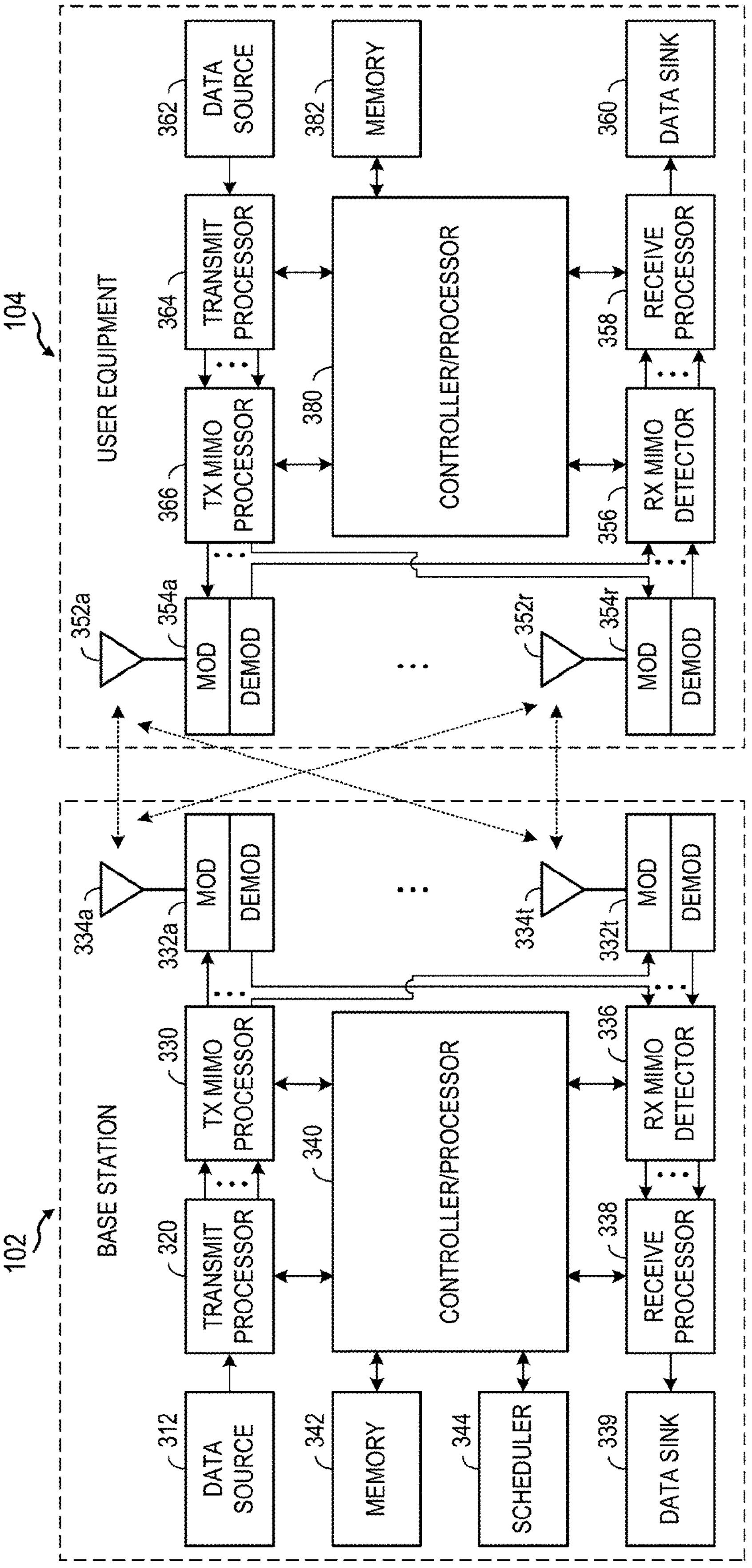
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
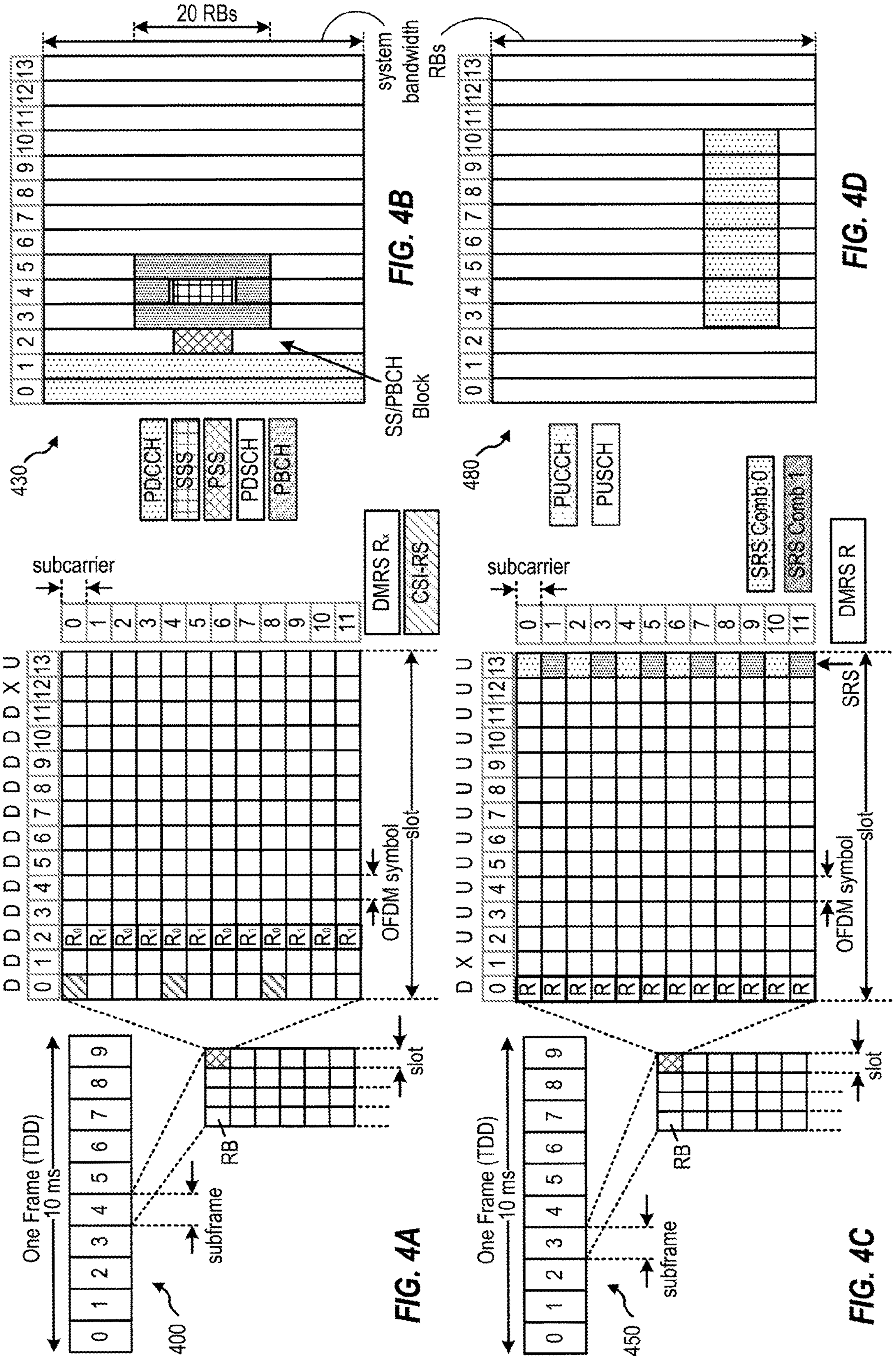
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Full Duplex Use Cases

Aspects of the present disclosure relate to wireless communications, and more particularly, to techniques for adjusting, based on communication with one or more network entities a configuration for transmission of measurement reference signals (RSs) in order to mitigate inter-gNB interference with coordination.

As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). HD communication may be considered baseline behavior in Release 15 (R-15) and 16 (R-16) of 5G NR. In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 5A:
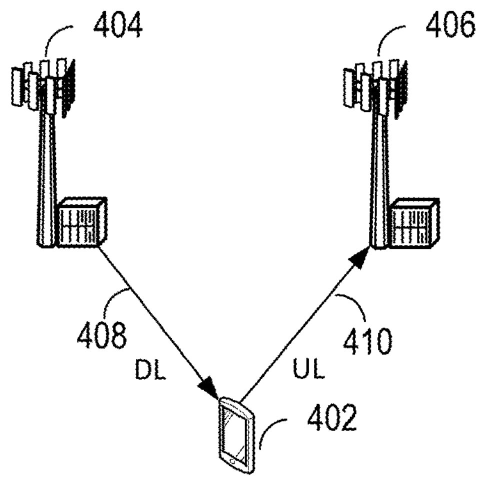
FIGS. 5A, 5B, and 5C illustrates different full-duplex use cases within a wireless communication network.
Figure 5B:
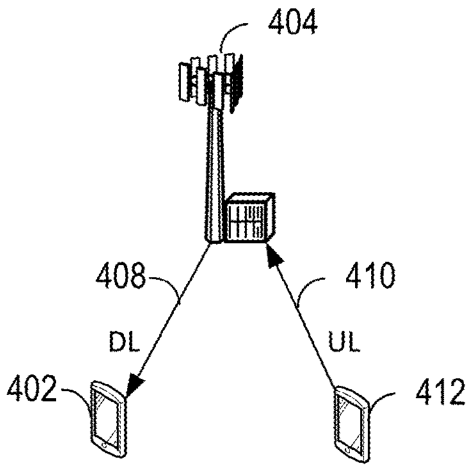
Figure 5C:
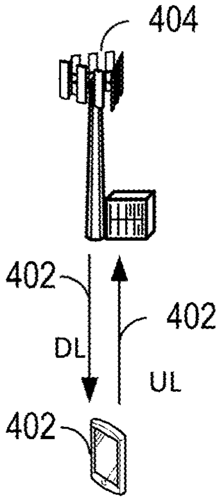

FIGS. 5A-5C illustrates different FD use cases within a wireless communication network, such as the wireless communication network 100. For example, FIG. 5A illustrates a first FD use case involving transmission between one UE 502 and two base stations (or multiple transmission reception points (mTRP)), BS 504 and BS 506. In some cases, UE 502 may be representative of UE 104 of FIG. 1 and BSs 504, 506 may be representative of BS 102 of FIG. 1. As shown, the UE 502 may simultaneously receive DL transmissions 508 from the BS 504 and transmit UL transmissions 510 to the BS 506. In some cases, the DL transmissions 508 and UL transmissions 510 may be performed using different antenna panels to facilitate the simultaneous transmission and reception.

A second FD use case is illustrated in FIG. 5B involving two different UEs and one BS. As illustrated, the UE 502 may receive DL transmissions 508 from the BS 504 while another UE 512 may simultaneously transmit UL transmission 510 to the BS 504. Thus, in this example, BS 504 is conducting simultaneous uplink and downlink communications.

A third FD use case is illustrated in FIG. 5C involving one BS and one UE. As illustrated, the UE 502 may receive DL transmissions 508 from the BS 504 and may simultaneously transmit UL transmissions 510 to the BS 504. As noted above, such simultaneous reception/transmission by the UE 502 may be facilitated by different antenna panels.

Table 1, below, illustrates various example scenarios in which each of the FD use cases may be used.

TABLE 1

| Base Station | UE | FD use case |
|---|---|---|
| FD disabled | FD disabled | Baseline R-15/16 5G behavior |
| FD disabled | FD enabled | Use case #1 (FIG. 5A) for mTRP |
| FD enabled | FD disabled | Use case #2 (FIG. 5B) + R-16 IAB |
| FD enabled | FD enabled | Use case #3 (FIG. 5C) |

As shown in Table 1, if FD capability is disabled at both the base station and UE, the baseline R-15 and R-16 5G behavior may be used (e.g., HD communication). If FD capability is disabled at the BS but enabled at the UE, the UE may operate according to the first example FD use case shown in FIG. 5A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 5B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 5C in which the BS and UE may communicate with each other simultaneously on the UL and DL, each of the BS and UE using different antenna panels for UL and DL transmissions.

FIG. 6A, FIG. 6B, FIG. 6C, and FIG. 6D illustrate example CLI scenarios for various FD communication use cases.

Figure 6A:
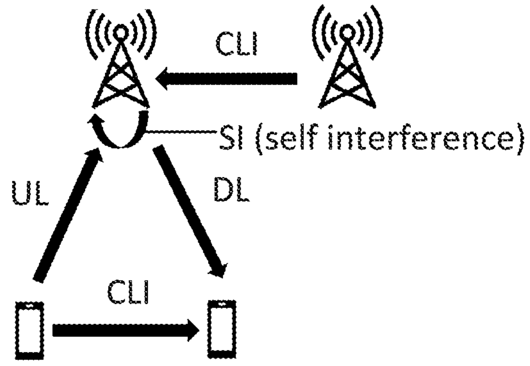
FIG. 6A, FIG. 6B, FIG. 6C, and FIG. 6D depict different interference scenarios occurring during full duplex (FD) communications.

As illustrated in FIG. 6A, a first CLI scenario may occur when FD is enabled for a gNB but disabled for each connected UE (which in turn may be enabled for half-duplex (HD) communication). The gNB may communicate using FD capabilities according to Use Case 2 of FIG. 5B. In this case, interference may include CLI between UEs, SI from the FD gNB, and CLI between the gNB and neighboring gNBs.

Figure 6B:
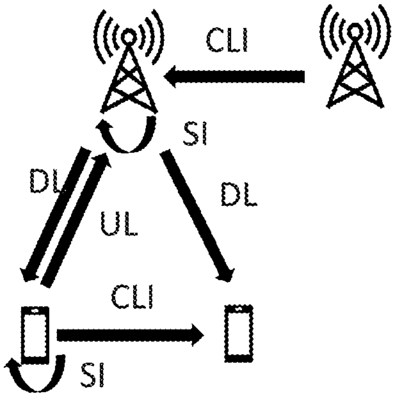

As illustrated in FIG. 6B, a second CLI scenario may occur when FD is enabled for both a gNB and an FD UE/customer premise equipment (CPE) connected to the gNB. The gNB may communicate with the FD UE using FD capabilities according to Use Case 3 of FIG. 5C. If the gNB is connected to a HD UE alongside the FD UE, the gNB communicates with the HD UE according to Use Case 2 of FIG. 5B. In this case, interference may include CLI between UEs, SI from the gNB and the FD UE, and CLI between the FD gNB and neighboring gNBs.

Figure 6C:
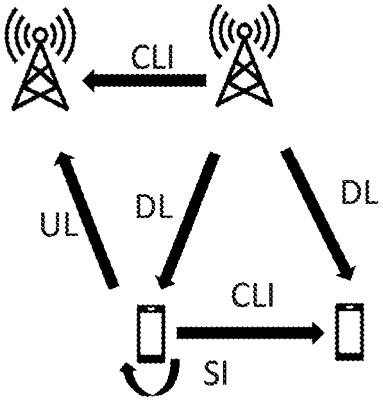

As illustrated in FIG. 6C, a third CLI scenario may occur when FD is disabled for two gNBs (e.g., in a multiple TRP scenario) and enabled at one UE/CPE connected to the two gNBs. The two gNBs may communicate with the FD UE using FD capabilities according to Use Case 1 of FIG. 5A. If one of the two gNBs is connected to a HD UE alongside the FD UE, the one gNB communicates with both the HD UE and the FD UE. In this case, interference may include CLI between UEs, SI from the FD UE, and CLI between the two gNBs.

Figure 6D:
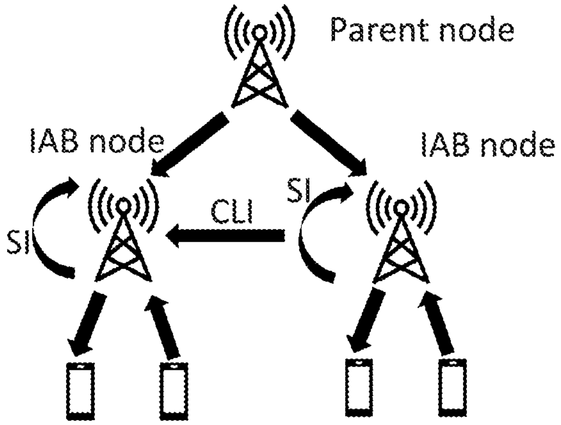

As illustrated in FIG. 6D, a fourth CLI scenario may occur when two FD IAB nodes have conditional enhanced duplexing capability. In the illustrated example, each of the two IAB nodes are connected to a parent node. Each IAB node may be enabled for FD communication and may communicate with at least two UEs according to Use Case 2 of FIG. 5B. In some cases, nodes involved in the FD use case depicted in FIG. 6D may support same frequency full duplex (SFFD) and frequency division multiplexing (FDM)/spatial division multiplexing (SDM) with resource block group (RBG) granularity. In this case, interference may include CLI between IAB nodes and SI from each IAB node.

As noted above, FD communication may be facilitated through the use of FDM or SDM. In FDM, the simultaneous UL and DL transmissions may be transmitted in the same time resources, but on separate frequency bands separated by some guard band. In SDM, the simultaneous UL and DL transmissions may transmitted on the same time and frequency resources but spatially separated into different, directional transmission beams. Such FD communication contrasts with HD communication that uses time division multiplexing (TDM), in order to schedule UL and DL transmissions on the same or different frequency resources, but at different times.

Aspects Related to Hostile Victim Detection

Figure 7A:
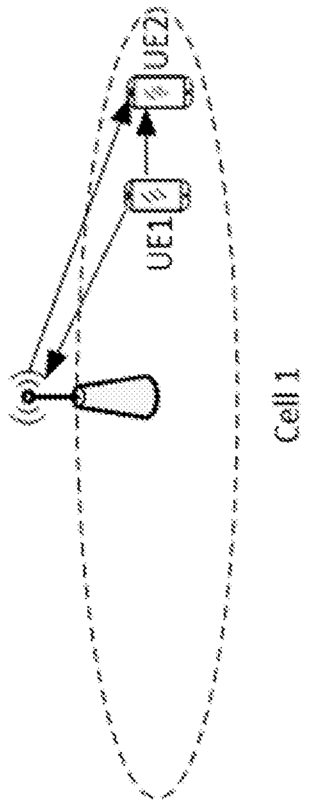
FIG. 7A and FIG. 7B depict different interference scenarios between user equipments (UEs).
Figure 7B:
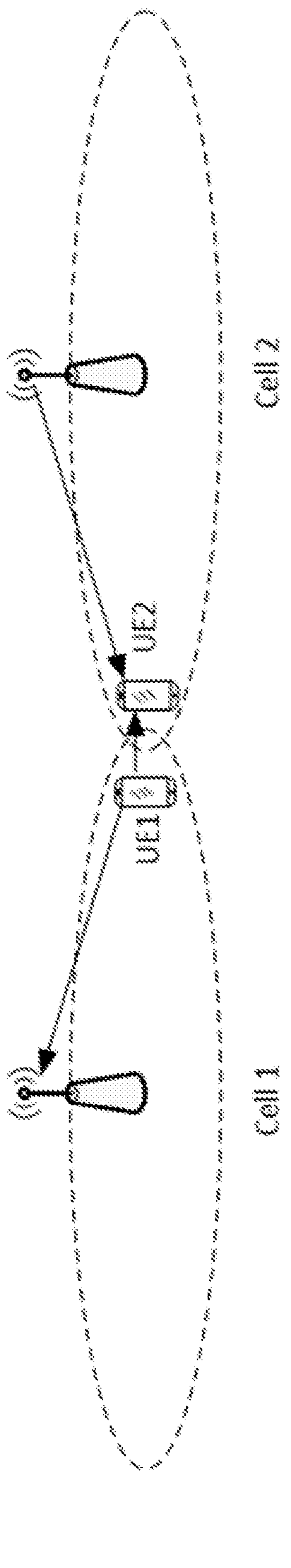

As previously described, CLI may occur when a network entity configures different time division duplexed (TDD) uplink (UL) and downlink (DL) slot formats to nearby user equipments (UEs). CLI can occur between two UEs on the same cell (e.g., UE1 and UE2 in FIG. 7A) or between two UEs on different cells (e.g., UE1 and UE2 in FIG. 7B).

Figure 8:
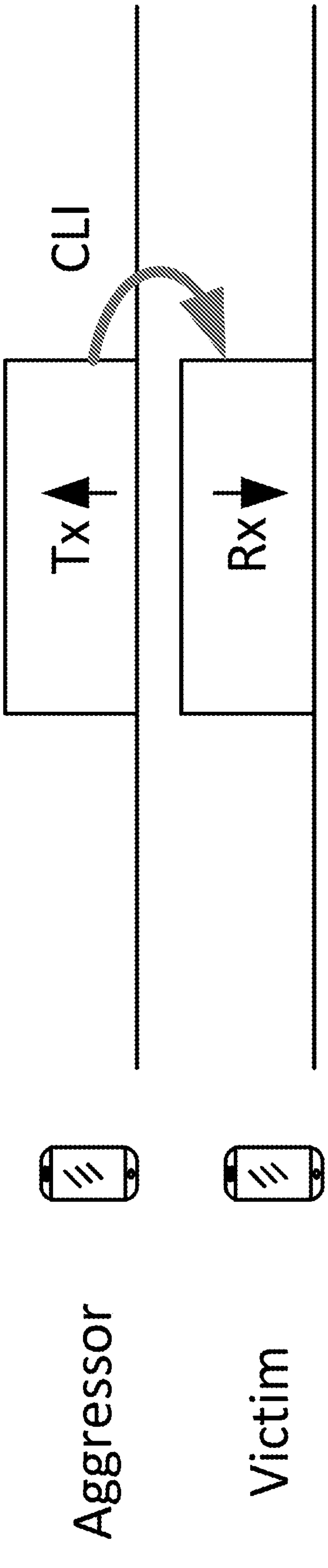
FIG. 8 depicts potential cross link interference (CLI) between aggressor and victim UEs.

As shown in FIG. 8, when a UE (e.g., an aggressor UE) is transmitting, another UE (e.g., a victim) may receive this transmission as CLI in its DL symbols if the aggressor UE's UL symbol collides with at least one DL symbol of the victim UE.

As described above, certain systems (e.g., NR Rel-16 systems) may support signaling that enables a procedure for a first UE (e.g., a real victim UE) to measure CLI from a second UE (e.g., a potential aggressor UE) by measuring reference signals transmitted by the potential aggressor UE on CLI measurement resources assigned to the potential aggressor UE. In some cases, the CLI measurement may be defined as a periodic layer-3 (L3) measurement based on sounding reference signal (SRS) RSRP or RSSI.

Based on CLI measurements reported by the real victim UE, the network may then identify the potential aggressor UE as a real aggressor UE, and trigger one or more solutions to try and remove the CLI. For example, the network may silence the interfering resource (e.g., "blank" by scheduling no transmission) and re-schedule the transmission (e.g., to another resource) to avoid the interference. As another example, the network may re-configure a directional beam or the transmission power at the real aggressor UE in an attempt to reduce the interference level. Other suitable methods to reduce or avoid CLI may also be employed.

Figure 9:
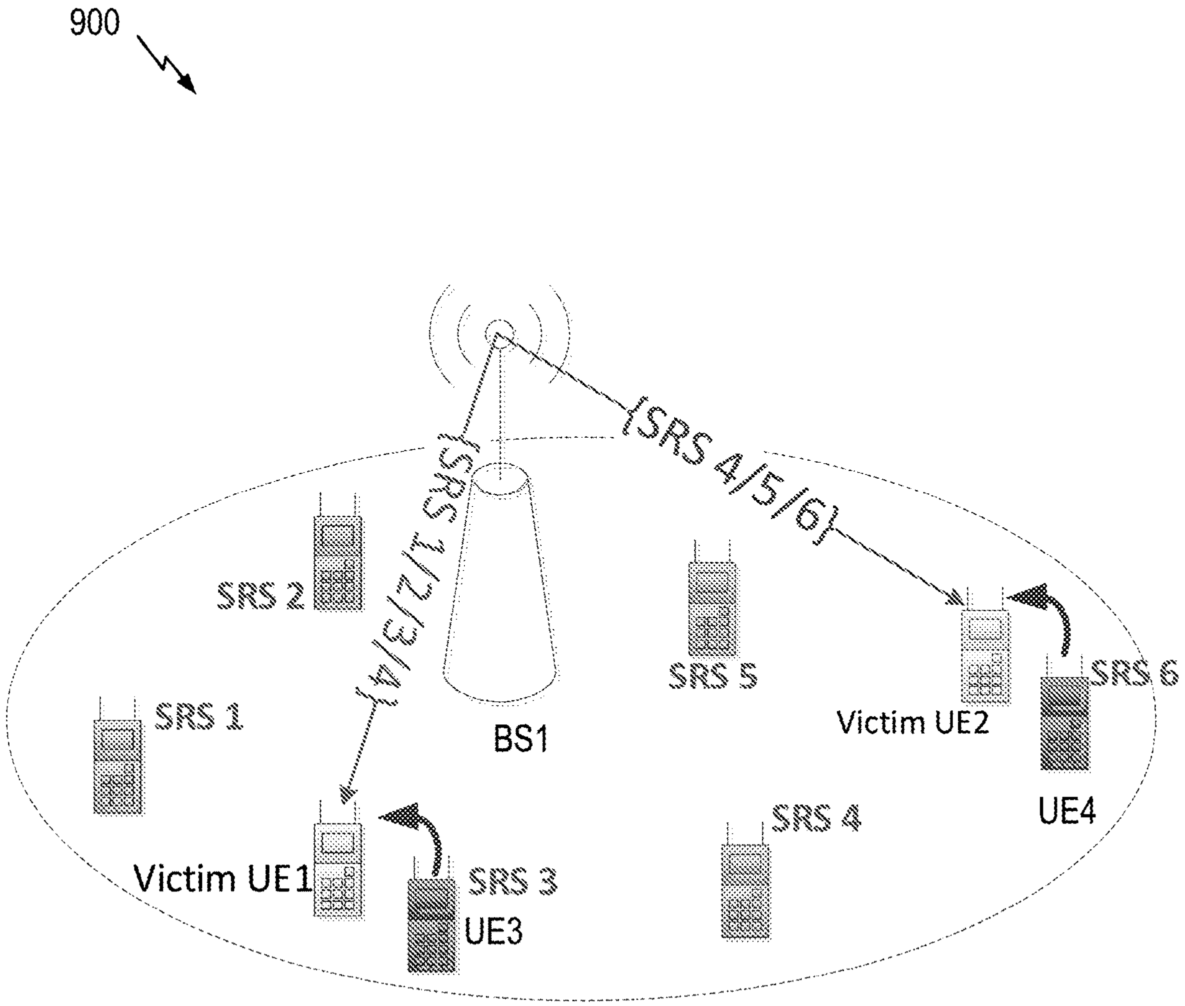
FIG. 9 and FIG. 10 depict example scenarios for interference measurement.

FIG. 9 illustrates how different victim and aggressor UEs may be configured for CLI detection. As shown in FIG. 9, a network entity (e.g., BS1) may configure multiple CLI resources to be monitored by one or more potential victim UEs. In the illustrated example, the network configures potential victim UE1 with four SRS resources (e.g., SRS-1/2/3/4), and configures potential victim UE2 with three SRS resources (e.g., SRS-4/5/6). A CLI resource may be for a CLI SRS RSRP measurement.

Each CLI resource may be associated with (assigned to) a potential aggressor UE. For example, as shown, SRS-3 may be associated with UE3 and SRS-6 may be associated with UE4. The potential victim UEs may measure the interference metrics (e.g., RSRP/RSSI) in the configured CLI resources. For example, the potential victim UE1 may measure SRS-1/2/3/4 and the SRS resource with high interference may be mapped to a real aggressor UE. In the illustrated example, SRS-3 may have the highest interference, indicating potential aggressor UE3 as a real aggressor UE. Similarly, the potential victim UE2 may measure SRS-4/5/6, and the SRS resource with high interference, SRS-6 in this example, may indicate potential aggressor UE4 as a real aggressor UE. In this manner, the network may determine which UE(s) are real aggressors, based on the resource indices and the reported CLI measurements, and take appropriate action (e.g., schedule the real aggressor UEs to another resource or reduce the transmission power of the real aggressor UEs).

Figure 10:
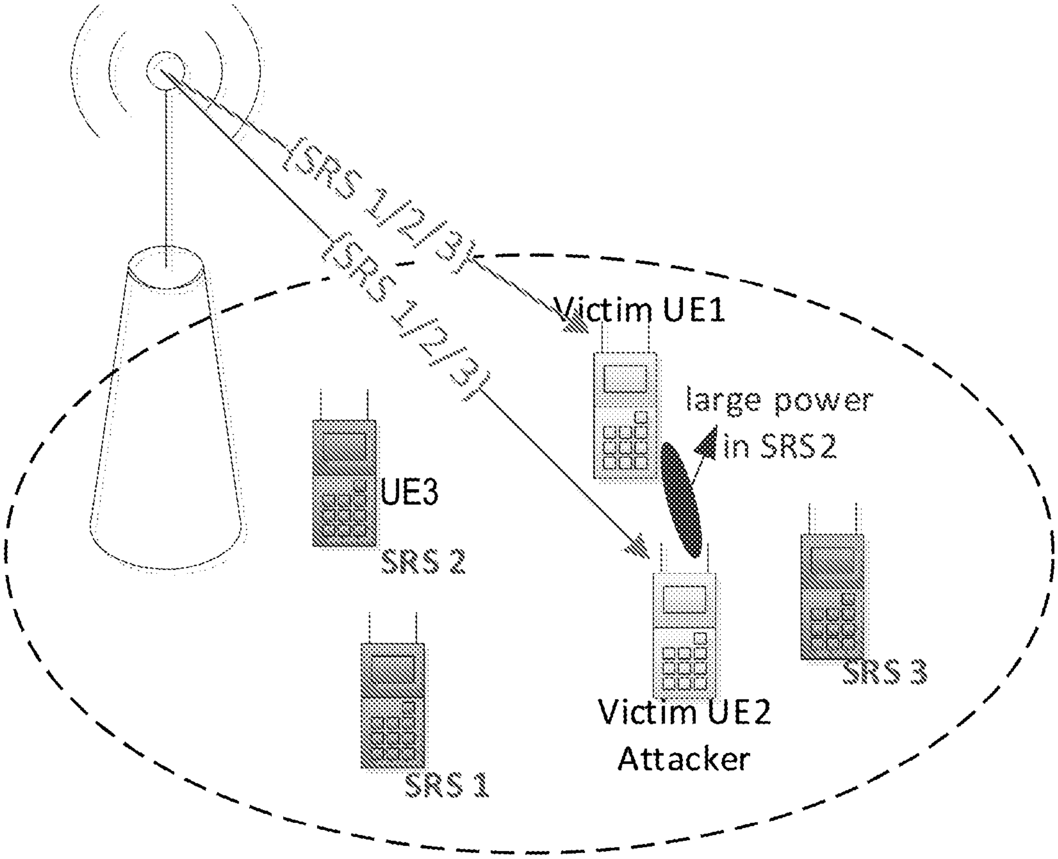

As noted above, in some cases, a potential victim UE may act as a hostile UE (e.g., a fake aggressor). In the example shown in FIG. 10, potential victim UE2, acting as a hostile UE, may carry out an attack by transmitting a large power transmission toward the real victim UE1 on a CLI resource assigned to a potential aggressor UE. In the illustrated example, the hostile UE2 transmits with high power on SRS-2 assigned to the potential aggressor UE3. In some cases, the hostile UE may receive the CLI resource configuration information (e.g., configuration information for SRS-1/2/3) from the network, and may transmit the large power transmission in a selected CLI resource (e.g., SRS-2).

In the selected resource used in the attack, one or more real victim UEs (e.g., real victim UE1) may detect the interference and report the large interference to the network. However, because the large interference is produced by the hostile UE2, not a real aggressor UE (e.g., potential aggressor UE3, which is assigned SRS-2), the network may incorrectly determine that the potential aggressor UE3 is a real aggressor UE causing the interference. In some situations, the hostile UE may not know the CLI configuration. However, the hostile UE may still transmit the large power transmission in some resources, leading to large interference to other victims. In such a case, the network may still incorrectly identify the real aggressor UE.

Figure 11:
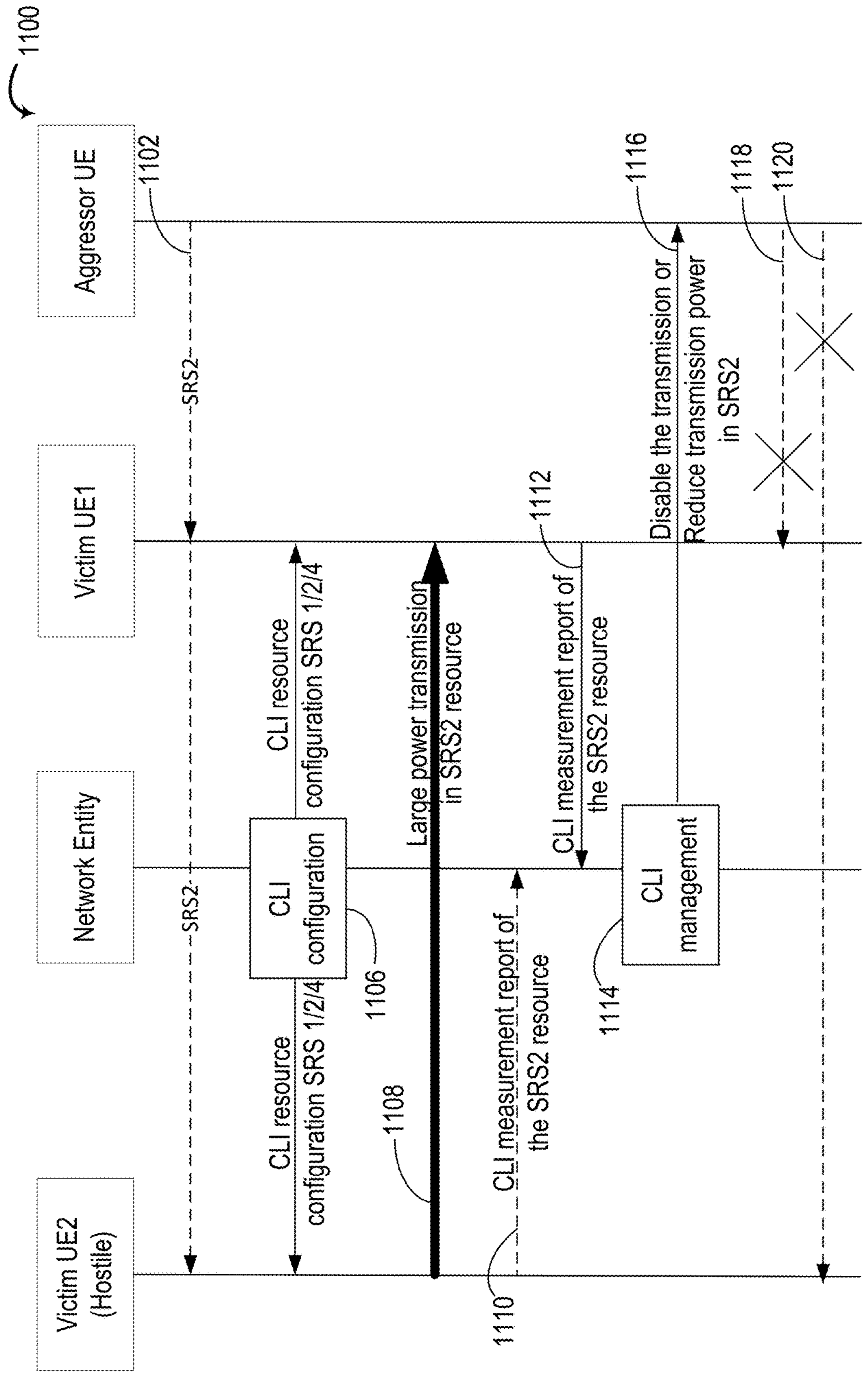
FIG. 11 depicts a call flow diagram for a CLI measurement procedure subject to a fake aggressor.

The timeline of such as hostile attack may be understood with reference to the call flow diagram 1100 of FIG. 11.

As illustrated, at 1102, a potential aggressor UE may be configured to transmit on CLI resource SRS2. A hostile UE (victim UE2 acting as a fake aggressor) may learn of the CLI configuration at 1106, indicating CLI resources SRS-1/2/4. At 1108, the hostile UE carries out an attack by transmitting with high power on the CLI resource SRS-2 assigned to the potential aggressor UE. In some cases, the hostile UE may even transmit a fake CLI measurement report at 1110 to report the interference from SRS-2.

A real victim UE (e.g., victim UE1), will report the CLI detected on SRS-2 based on the large power transmission from the hostile UE2, unaware the CLI is actually caused by the high power transmission from the hostile UE2, not the potential aggressor UE. In response to one or both of the CLI measurement reports, the network may perform CLI management at 1114 to try to prevent the CLI in the SRS-2. For example, the network may transmit an indication at 1116 to disable the transmission of the resource SRS-2 by the potential aggressor UE (e.g., as shown by the X's over the transmissions at 1118 and 1120). However, the hostile UE2, not the potential aggressor UE, occupies the resource associated to the SRS-2, so the CLI management may not succeed in preventing the CLI caused by the hostile UE2.

Aspects of the present disclosure, however, provide techniques that may be used to detect the presence of a hostile UE. In some cases, the hostile UE may also be identified. In some cases, an attack by a hostile UE may be avoided using a two-stage CLI measurement configuration.

Figure 12:
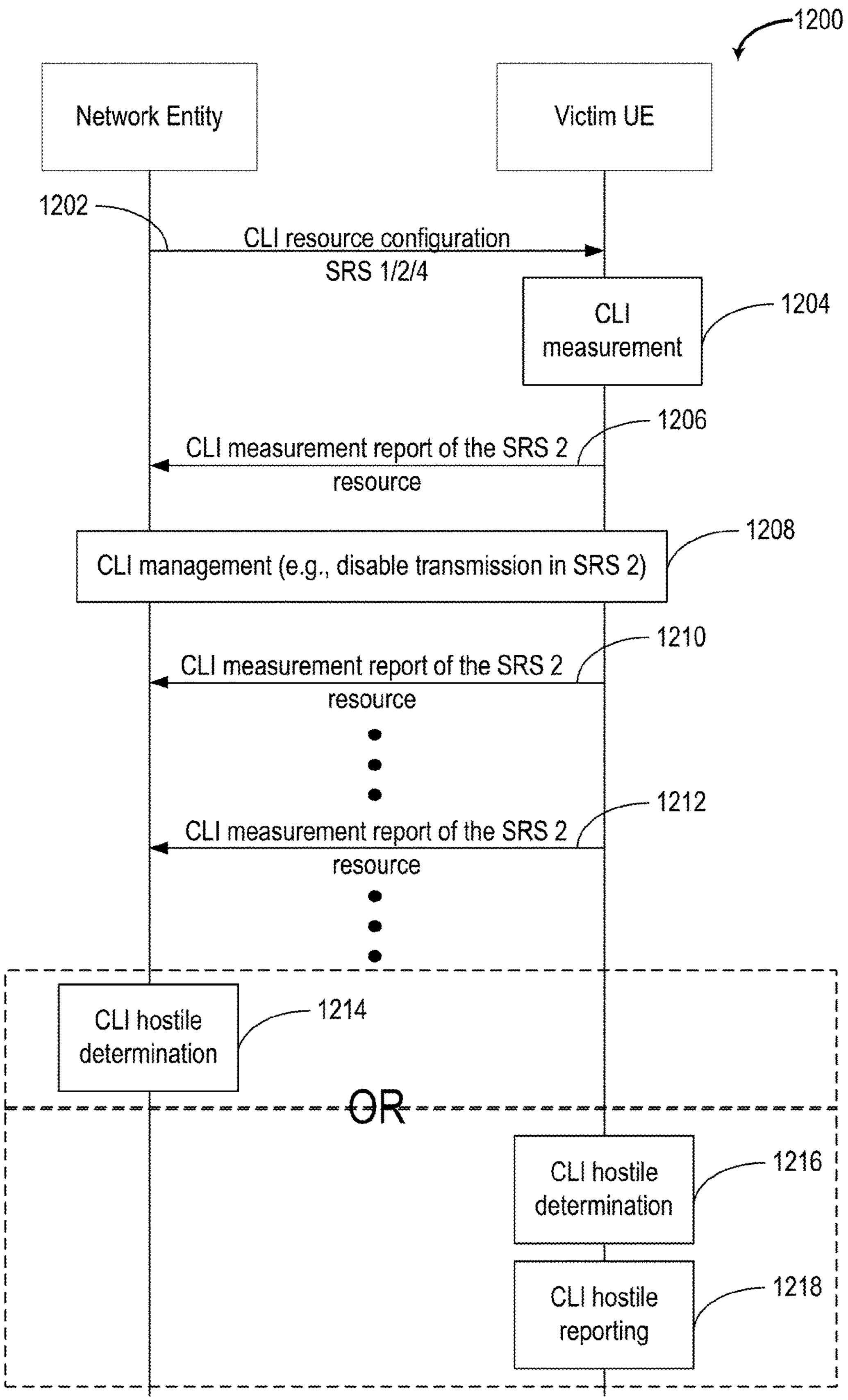
FIG. 12 depicts a call flow diagram for a procedure to detect a possible hostile device, in accordance with aspects of the present disclosure.

As illustrated in the call flow diagram 1200 of FIG. 12, hostile determination may be determined at the network entity (e.g., gNB) or by a real victim UE.

As illustrated, after the network entity configures the real victim UE with CLI resources, at 1202, the real victim UE may perform CLI measurement, at 1204. In the illustrated example, the real victim UE is configured with CLI resources SRS-1/2/4 and reports CLI on SRS-2. In response, as part of CLI management, the network entity may disable transmission in SRS-2, at 1208.

The network entity may determine the presence of a hostile UE (e.g., a UE acting as a fake aggressor), for example, if the real victim UE continues to report CLI on SRS-2 (at 1210 and 1212), even after the CLI management actions taken at 1208. In other words, the network entity may infer the presence of a hostile UE, based on the continued presence of CLI reports for SRS-2.

In some cases, a hostile UE may be detected by the real victim UE. For example, if a real victim UE always detects strong CLI in one resource, even after a report has been sent to the network (indicating strong CLI for that resource), the real victim UE may determine that the resource is occupied by a hostile UE and report that determination back to the network. In the example shown in FIG. 12, if the real victim UE continues to detect high CLI on SRS-2 even after reporting, at 1216, the real victim UE may determine that there is a hostile UE based on the continued CLI reports and may, at 1218, report the presence of the hostile UE to the network.

There are various mechanisms that might be deployed in order to actually detect the presence of a hostile UE. Because a hostile UE may be a potential victim UE, any actions to configure potential victim UEs may be subject to eavesdropping by the hostile UE, resulting in the hostile UE obtaining sufficient information to launch an attack (by transmitting with high power on a CLI resource assigned to a potential aggressor UE).

Figure 13:
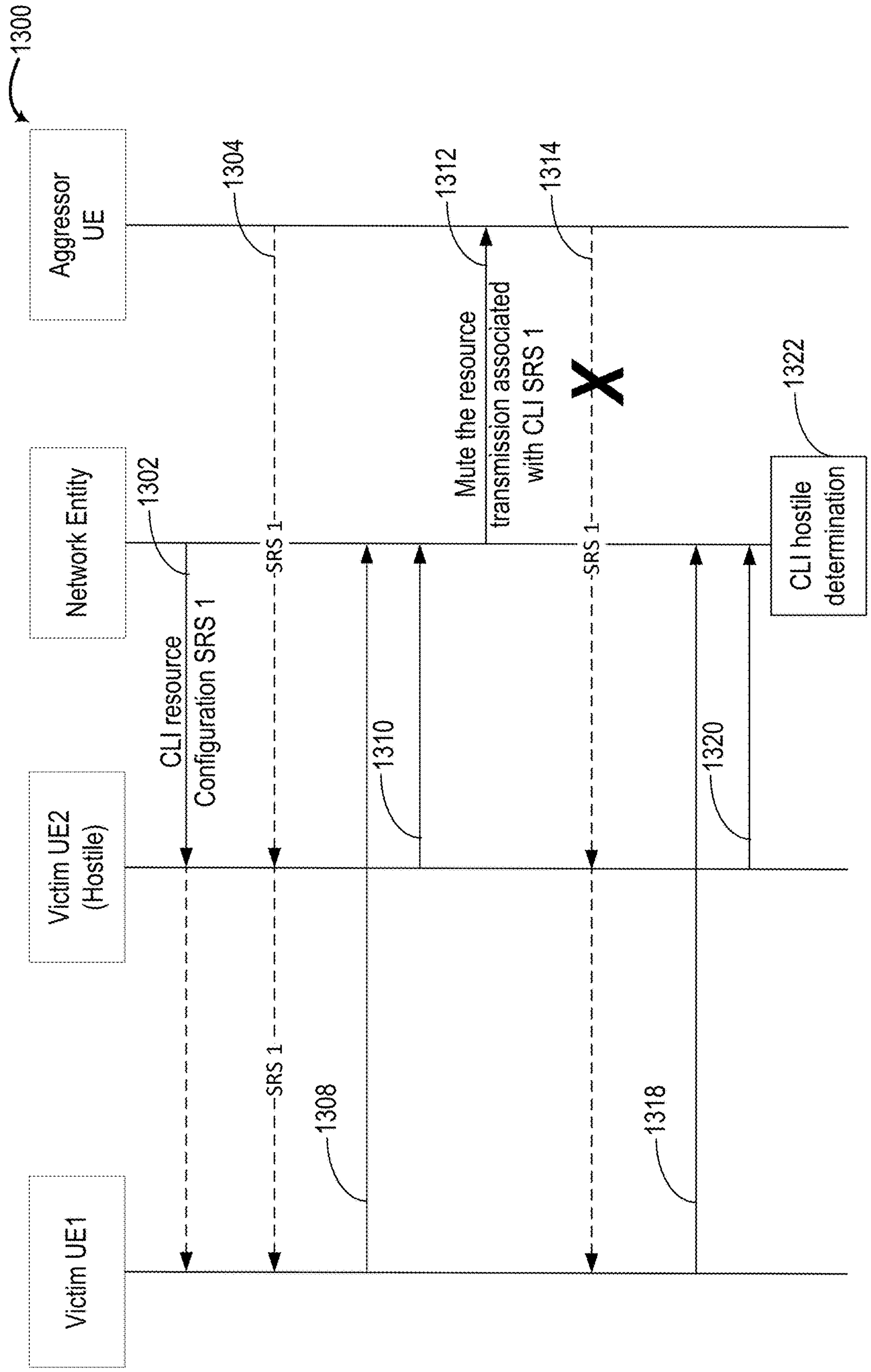
FIG. 13 depicts a call flow diagram for a procedure to detect a possible hostile device, in accordance with aspects of the present disclosure.

FIG. 13 illustrates an example method for the network entity to determine that a hostile UE exists, by muting some uplink signal transmissions by potential aggressor UEs.

As shown, at 1302 the network entity may configure the potential victim UE with one or more CLI resources (e.g., SRS-1). This configuration may be overheard by the potential victim UE2, acting as the hostile UE. At 1304, the potential aggressor UE transmits on SRS-1 (which may be detected by the real victim UE1 and the hostile victim UE2. The real victim UE1 and the hostile UE2 may perform CLI measurements and transmit CLI measurement reports to the network entity at 1308 and 1310, respectively. The CLI measurement reports may indicate CLI in the SRS-1 resource, which is associated with the potential aggressor UE.

At 1312, the network entity may perform CLI management to attempt to stop the CLI in the SRS-1 resource. For example, the network entity may mute some UL signals transmissions in the potential aggressor UE associated with the SRS-1 resource. The potential aggressor UE may then, at 1314 and 1316, refrain from transmitting the muted UL transmission. If a hostile UE is using the CLI resource(s) associated with the potential aggressor UE, real victim UEs (and possibly the hostile UE) will continue to report large CLI associated with the CLI resource, as shown at 1318 and 1320. Then, at 1322, the network entity may determine that there is a hostile UE based on the continued CLI reports.

In a typical case, the hostile UE is likely to be relatively close to the real victim UE(s). Accordingly, in some examples, the network entity may be able to roughly estimate the position of the hostile UE based on the position of the real victim UE(s). For example, shown in the figure, When there is still reporting when the resource CLI SRS1 is muted, the hostile UE is detected.

According to certain aspects, the network may configure the potential aggressor UE with a transmission power variation pattern in the CLI resource. With varied transmission power pattern, the expected RSRP/RSSI pattern observed in CLI measurement reports received from real victim UEs should be expected to follow the configured transmission power variation pattern.

Figure 14:
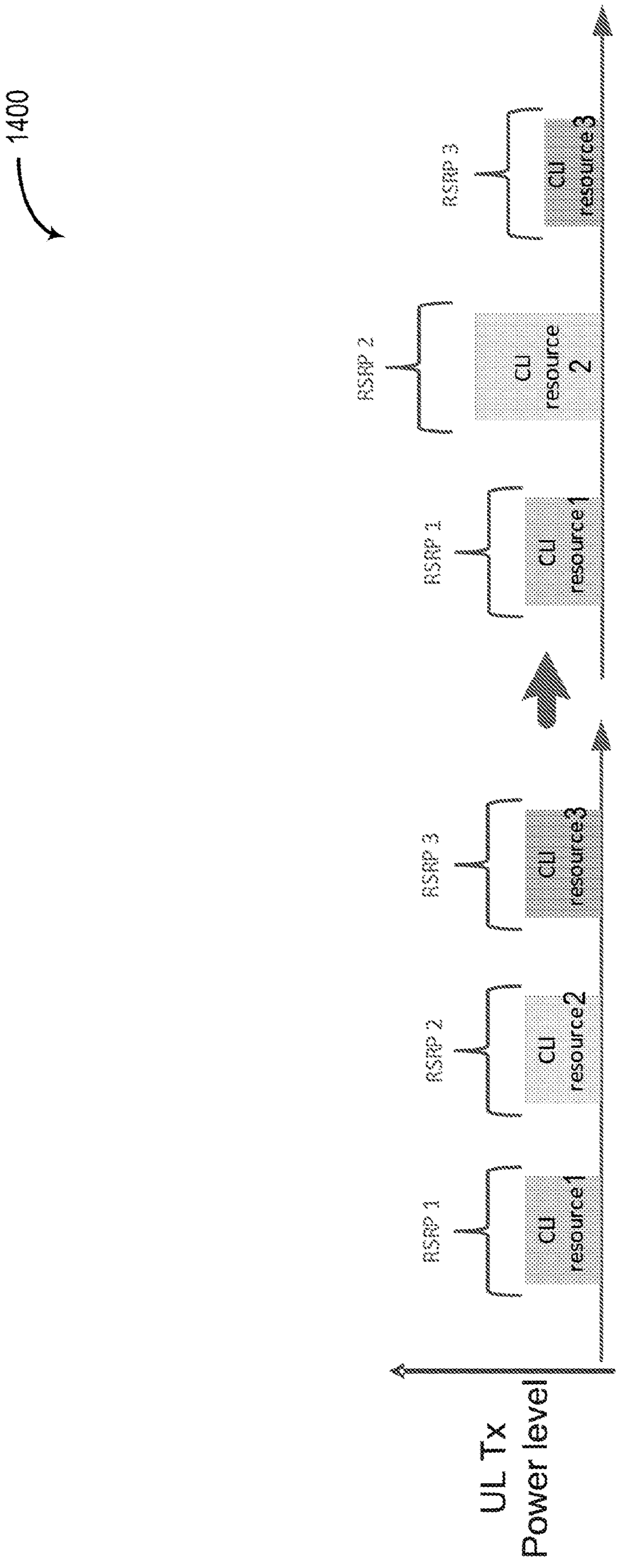
FIG. 14 depicts an example transmission power pattern to detect a possible hostile device, in accordance with aspects of the present disclosure.

In a typical hostile UE attack, in order to occupy the resource, a hostile UE will transmit using the largest power available in order to cause interference with other victim UEs. Accordingly, the RSRP/RSSI reported in the CLI measurement reports would be uniform, as shown to the left of the arrow in FIG. 14. In contrast, if configured with a transmission power variation pattern, the potential aggressor UE may vary the UL transmission power in the resource associated with one or more CLI resources, as shown to the right of the arrow in FIG. 14.

The network entity would expect that the actual RSSI/RSRP reported by a real victim UE would follow the power variation pattern. Thus, if the real victim UE reports RSSI/RSRP in a uniform pattern instead of the expected power variation pattern, the network entity may determine that a hostile UE exists.

According to certain aspects, the network entity may configure the potential aggressor UE to follow a round-robin pattern with respect to the one or more CLI resources that the potential aggressor UE disables. In certain aspects, the network entity may configure the potential aggressor UE to follow a round-robin pattern with respect to the transmission power variation for the one or more CLI resources. For example, the potential aggressor UE may be associated with three CLI resources, and the potential aggressor UE may mute UL transmissions on the three CLI resources following the round-robin pattern.

As another example, the potential aggressor UE may vary the transmission power of UL transmissions on the three CLI resources following the round-robin pattern. For instance, in FIG. 14, CSI resource 1 is illustrated with a medium transmit power, CSI resource 2 is illustrated with a high transmit power, and CSI resource 3 is illustrated with a low transmit power. Then, during a subsequent round of UL transmissions, the CSI resource 1 may have a low transmit power, CSI resource 2 may have a medium transmit power, and CSI resource 3 may have a high transmit power. In some examples, the network entity configures the potential aggressor UE with the pattern before the victim UE performs CLI measurements (e.g., before the network entity performs CLI configuration).

Alternatively, the silent periods and/or the power variation pattern may be random. In some cases, the potential aggressor UE may make the determination of whether to mute a transmission or vary a transmission power level at a given time. The potential aggressor UE may report the random pattern to the network entity after the real victim UE(s) performs CLI measurement, to avoid the hostile UE eavesdropping and learning of the pattern.

Figure 15:
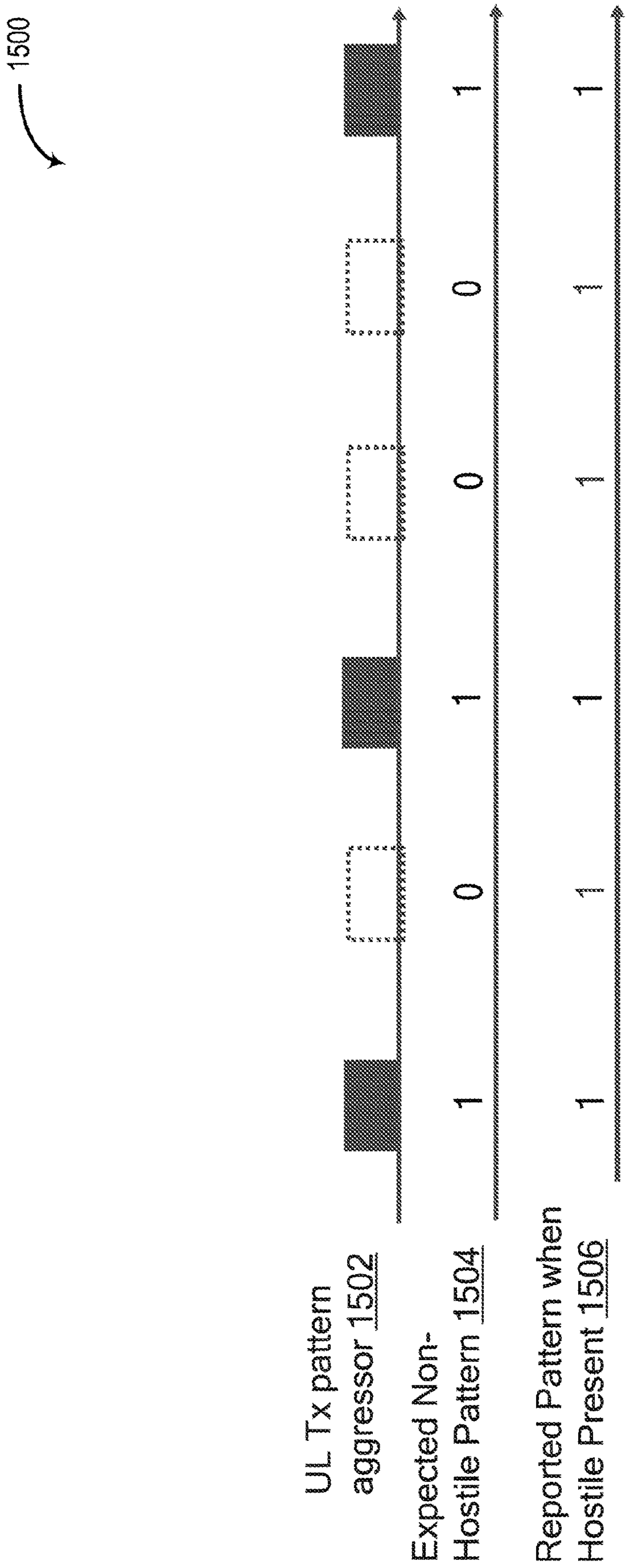
FIG. 15 depicts an example of CLI reporting pattern to detect a possible hostile device, in accordance with aspects of the present disclosure.

CLI measurement reports may include RSSI or RSRP. These metrics help the network entity determine the interference level and identify real aggressor UEs. However, for hostile UE detection purposes, reporting these metrics may be unnecessary and may represent a significant waste in terms of signaling overhead. According to certain aspects, for purposes of hostile UE detection, the network entity may configure the real victim UE(s) to report a single bit (instead of RSSI or RSRP) to indicate whether or not CLI is detected, as shown in FIG. 15.

For example, if the UL transmissions of a potential aggressor UE (illustrated at 1502) are muted by following a pattern (101001), in the corresponding CLI measurement reports, the network entity would expect the report to indicate no CLI (e.g., a bit indicating binary "0") when the UL transmission is muted, and to indicate CLI (e.g., a bit indicating binary "1") when the UL transmission is not muted, as shown at 1504. However, when the CLI is caused by a hostile UE, the network entity would expect the CLI measurement report to indicate constant CLI (e.g., to report CLI even when a "0" is expected because the UL transmission is muted), as shown at 1506. Thus, the network may interpret a pattern of CLI reports that differs from the expected pattern as indicating the presence of a hostile UE.

As another example, if the potential aggressor UE is configured to vary the UL transmit power following one pattern, the network entity would expect the reported CLI measurements to follow the pattern. This information, indicating detection of the pattern by the real victim UE(s), may be simplified as a single bit. For example, the CLI measurement report may include a sequence of bits, with each bit indicating binary "1" corresponding to the victim UE detecting CLI, and each bit indicating binary "0" corresponding to the victim UE not detecting CLI. The network entity may then compare the reported sequence to the expected sequence, and determine whether a hostile UE exists based on whether the reported sequence matches the expected sequence.

Figure 16:
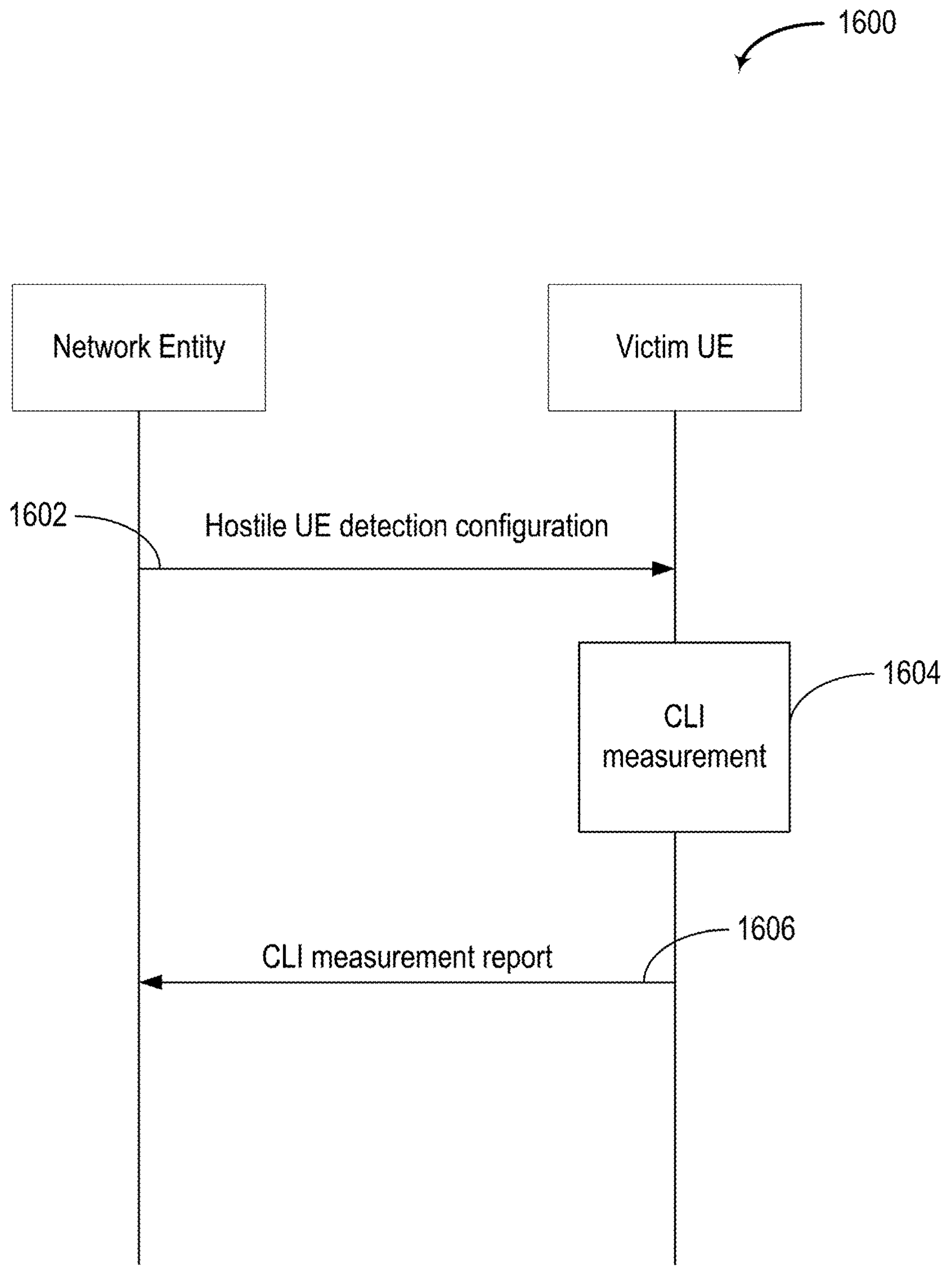
FIG. 16 depicts a call flow diagram for a procedure to detect a possible hostile device, in accordance with aspects of the present disclosure.

In the case where the potential aggressor UE varies UL transmission power based on a pattern, additional bits may be used to represent the different transmission power levels. In some aspects, the CLI measurement report may include sequence of indices, each representing a relative power level of measured CLI. The network may configure the potential aggressor UE with a pre-defined power level set. Then, after CLI measurement, the real victim UE may report the corresponding indices of the power level. For example, as illustrated in FIG. 16, the network entity may indicate the hostile detection configuration (e.g., a CLI procedure) to the victim UE at 1602. In some examples, the configuration may include a single bit which indicates that the transmitted CLI procedure is for hostile UE detection. The configuration may include any of the CLI measurement reporting methods described above.

Figure 17:
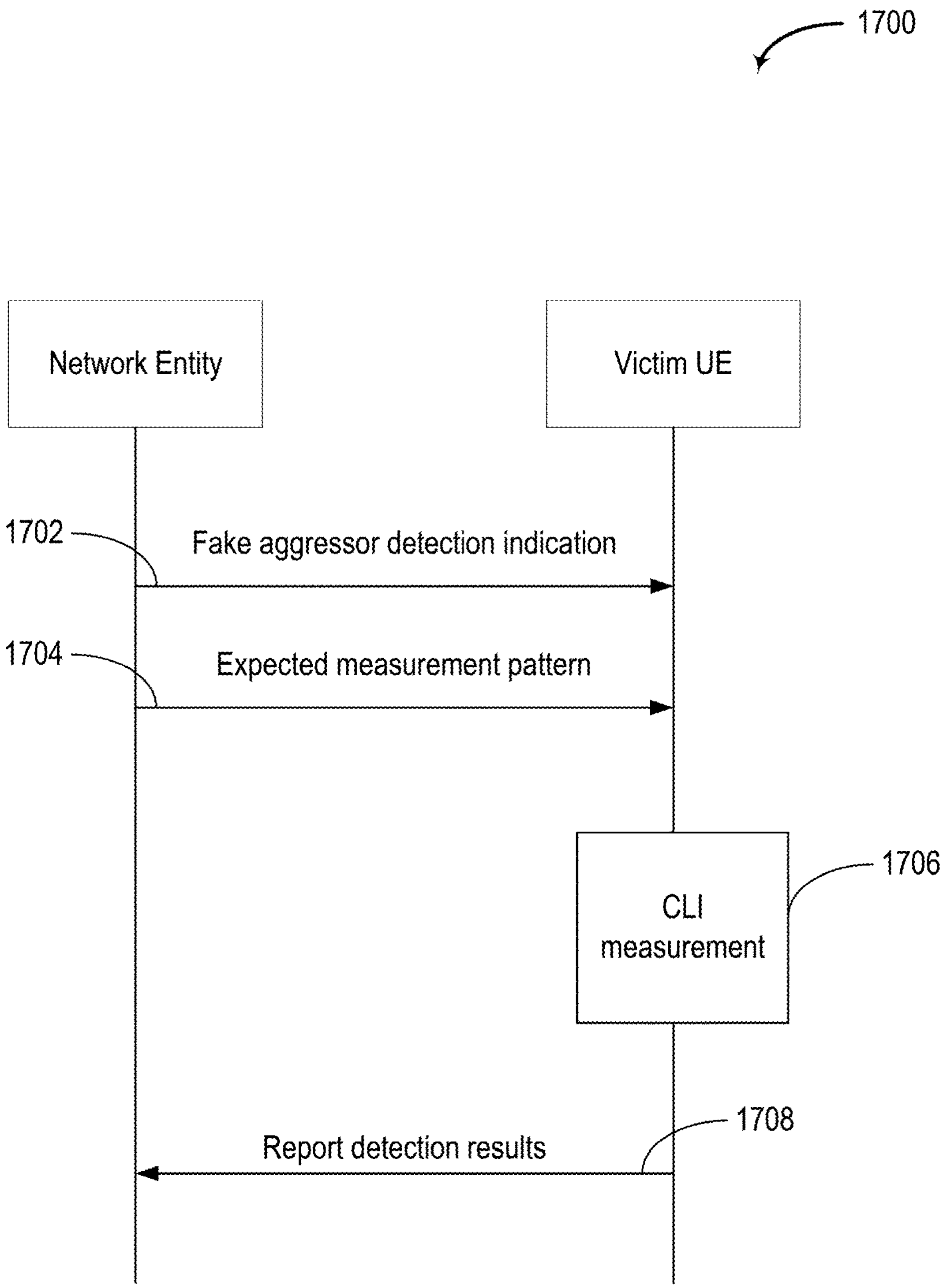
FIG. 17 depicts a call flow diagram for a procedure to detect a possible hostile device, in accordance with aspects of the present disclosure.

While detection of the hostile UE is described above as being performed by the network entity based on victim UE reporting, the detection may be performed by the real victim UE if the network entity can determine that the victim UE is a legitimate UE (e.g., a real UE, not a hostile UE), as shown in FIG. 17. In this case, at 1702, the network entity may indicate the hostile detection configuration to the legitimate victim UE. For example, the network entity may inform the legitimate victim UE of the expected measurement pattern, at 1704. In some examples, the legitimate victim UE may perform CLI measurements at 1706 and report the detection results to the network at 1708. In other examples, the legitimate victim UE may not transmit CLI measurement reports, which may lower power consumption. Instead, the legitimate victim UE may simply report the detection results, which may include whether a hostile UE was detected and the corresponding CLI resource index.

Aspects of the present disclosure also provide techniques for avoiding hostile CLI by preventing a potential hostile's ability to perform an attack. In cases where a victim UE reports RSRP in the CLI measurement reports, the network entity may initially only configure a partial CLI resource configuration to the victim UE.

Figure 18:
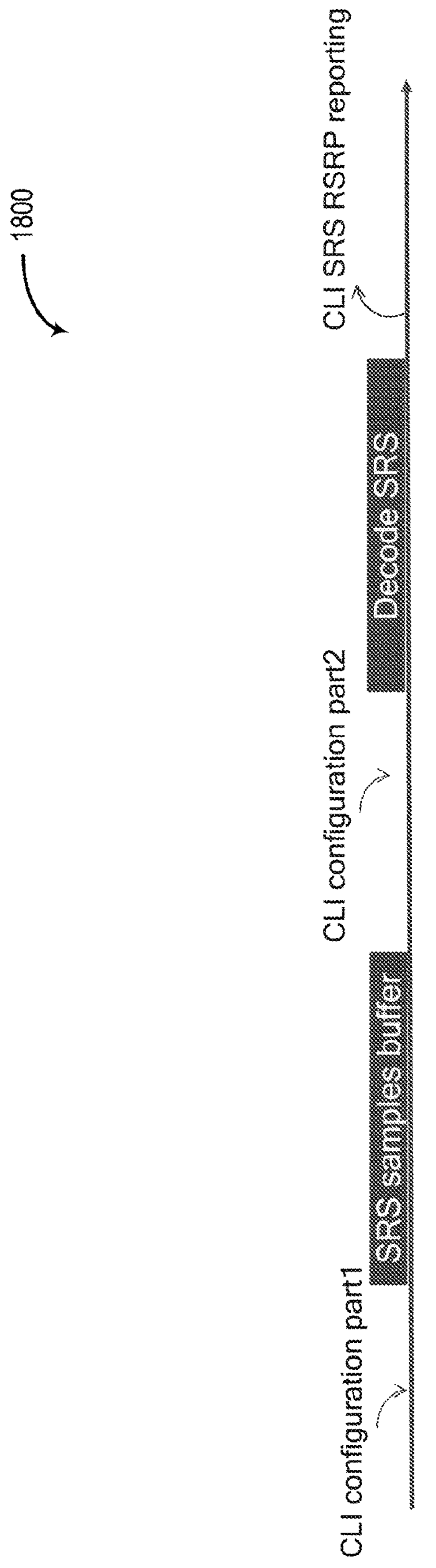
FIG. 18 depicts an example of a two-part CLI measurement procedure, in accordance with aspects of the present disclosure.

For example, as shown in FIG. 18, the CLI resource configuration may be split into two stages. First, the network entity may provide the frequency and time resource information of the configured CLI SRS RSRP. However, the network entity may not provide the information to actually decode SRS until later. Accordingly, during the CLI measurement stage, the legitimate victim UE can buffer the SRS sample without performing decoding. Then, after the legitimate victim UE completes the SRS sampling, the network entity may signal the remaining information (related to SRS decoding) to the legitimate victim UE. As a result, a hostile UE may not obtain all of the configuration information until after the legitimate victim UEs have performed CSI measurements. Accordingly, the hostile UE does not get a chance to act like a fake aggressor UE.

Example Operations of Network Entities

Figure 19:
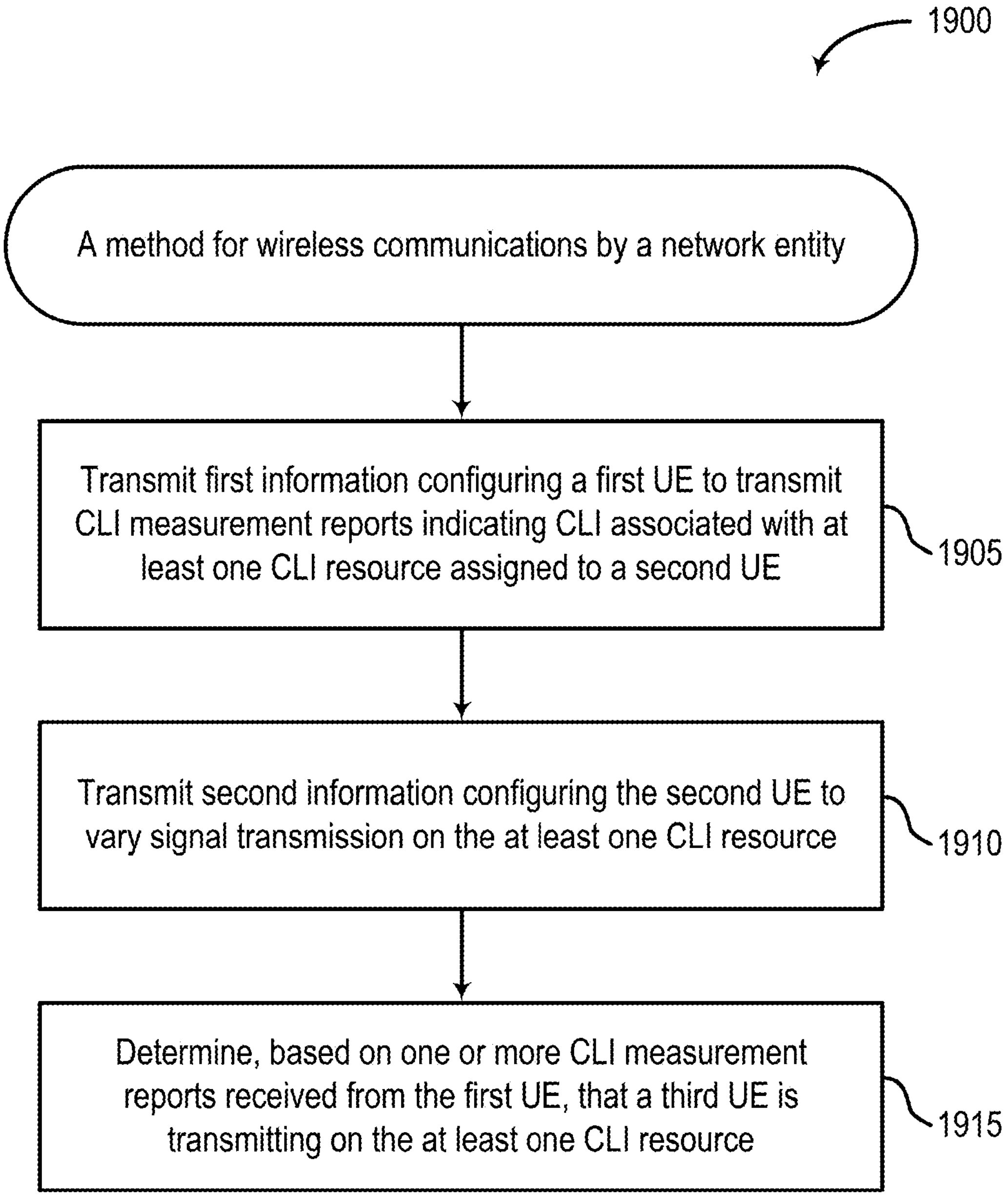
FIG. 19 depicts a method for wireless communications.

FIG. 19 shows a method 1900 for wireless communications by a network entity, such as BS 102 of FIGS. 1 and 3, or a disaggregated base station as discussed with respect to FIG. 2.

Method 1900 begins at 1905 with transmitting first information configuring a first UE (e.g., a potential victim UE) to transmit CLI measurement reports indicating CLI associated with at least one CLI resource assigned to a second UE (e.g., a potential aggressor UE). In some cases, the operations of this step refer to, or may be performed by, UE configuration circuitry as described with reference to FIG. 23.

Method 1900 then proceeds to step 1910 with transmitting second information configuring the second UE to vary signal transmission on the at least one CLI resource. In some cases, the operations of this step refer to, or may be performed by, UE configuration circuitry as described with reference to FIG. 23.

Method 1900 then proceeds to step 1915 with determining, based on one or more CLI measurement reports received from the first UE, that a third UE (e.g., a hostile UE) is transmitting on the at least one CLI resource. In some cases, the operations of this step refer to, or may be performed by, CLI report processing circuitry as described with reference to FIG. 23.

In some aspects, the second information configures the second UE to refrain from transmitting signals on the at least one CLI resource during one or more silent periods. In some aspects, determining that the third UE is transmitting on the at least one CLI resource comprises determining that the CLI measurement reports indicate the third UE is transmitting on the at least one CLI resource during the one or more silent periods. In some aspects, the CLI measurement reports indicate transmission on the at least one CLI resource during the one or more silent periods by including a resource index corresponding to the at least one CLI resource.

In some aspects, after determining that the third UE is transmitting on the at least one CLI resource, the method 1900 further includes estimating a position of the third UE based on proximity of the third UE to the second UE. In some aspects, the method 1900 further includes identifying the third UE based on the estimated position of the third UE.

In some aspects, the second information configures the second UE to vary transmission power levels, when transmitting signals on the at least one CLI resource, according to a transmission power variation pattern. In some aspects, determining that the third UE is transmitting on the at least one CLI resource comprises determining the CLI measurement reports indicate metrics different than expected if only the second UE were transmitting signals on the at least one CLI resource according to the transmission power variation pattern.

In some aspects, the method 1900 further includes receiving an indication of the transmission power variation pattern from the second UE before determining the CLI measurement reports indicate metrics different than expected if only the second UE were transmitting signals on the at least one CLI resource according to the transmission power variation pattern.

In some aspects, the CLI measurement reports include binary indications, each indicating whether the first UE detected CLI associated with the at least one CLI resource during a corresponding measurement period. In some aspects, determining that the third UE is transmitting on the at least one CLI resource comprises determining the CLI measurement reports indicate binary indications different than binary indications expected if only the second UE, configured according to the second information, were transmitting on the at least one CLI resource.

In some aspects, the CLI measurement reports include a sequence of indices, each index representing a relative power level of CLI measured by the first UE on the at least one CLI resource during a corresponding measurement period. In some aspects, determining that the third UE is transmitting on the at least one CLI resource comprises determining the CLI measurement reports indicate a sequence of indices different than expected if only the second UE were transmitting on the at least one CLI resource while varying signal transmission on the at least one CLI resource according to the second information.

In some aspects, the first information includes at least one bit indicating how the first UE is to perform CLI measurement reports. In some aspects, before determining that the third UE is transmitting on the at least one CLI resource, the method 1900 further includes transmitting the second information to the first UE. In some aspects, determining that the third UE is transmitting on the at least one CLI resource is based on an explicit indication in the CLI measurement reports that the third UE is transmitting on the at least one CLI resource.

Figure 23:
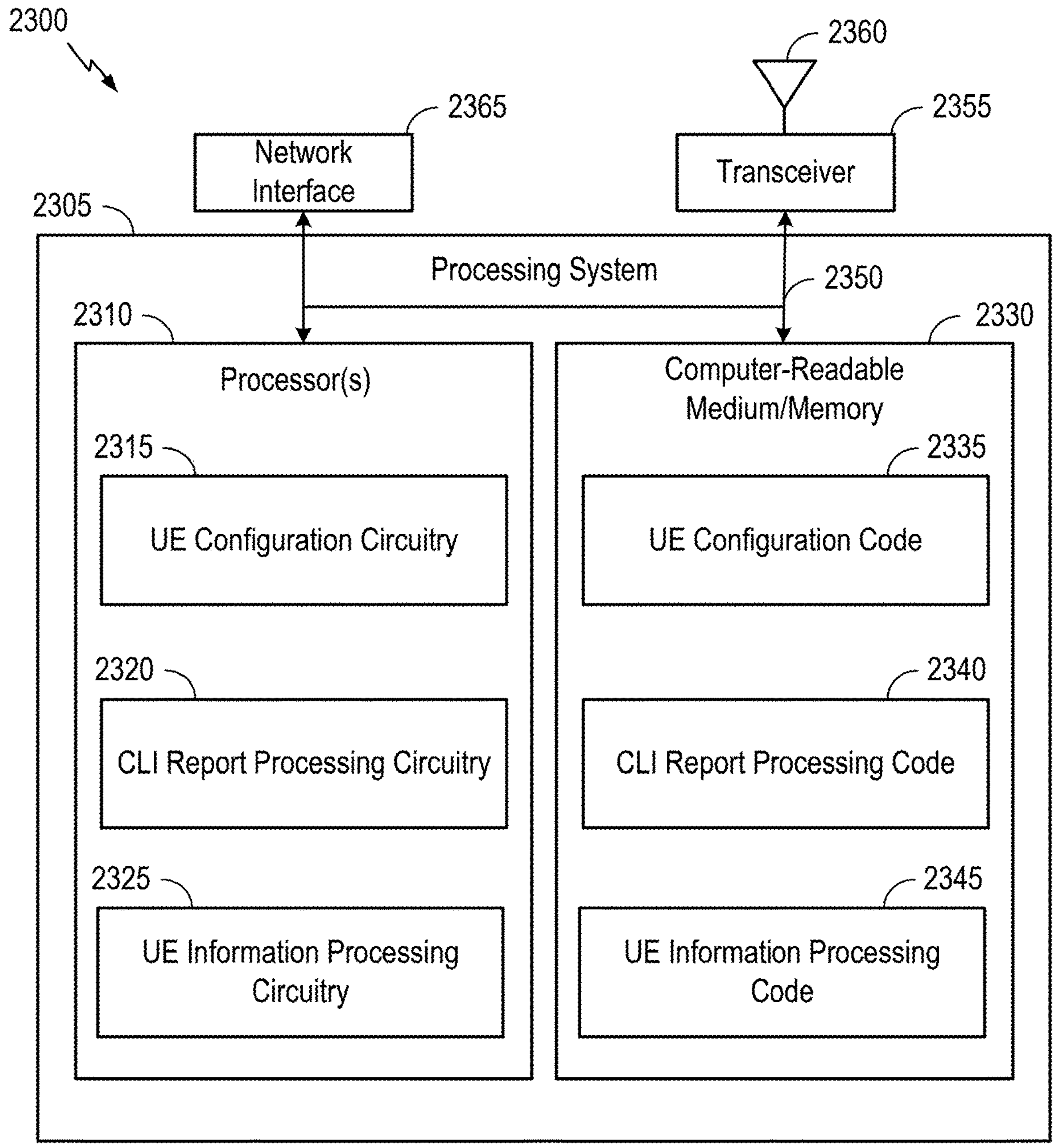
FIG. 23 depicts aspects of an example communications device.

In one aspect, method 1900, or any aspect related to it, may be performed by an apparatus, such as communications device 2300 of FIG. 23, which includes various components operable, configured, or adapted to perform the method 1900. Communications device 2300 is described below in further detail.

Note that FIG. 19 is just one example of a method, and other methods including fewer, additional, or alternative steps are possible consistent with this disclosure.

Figure 20:
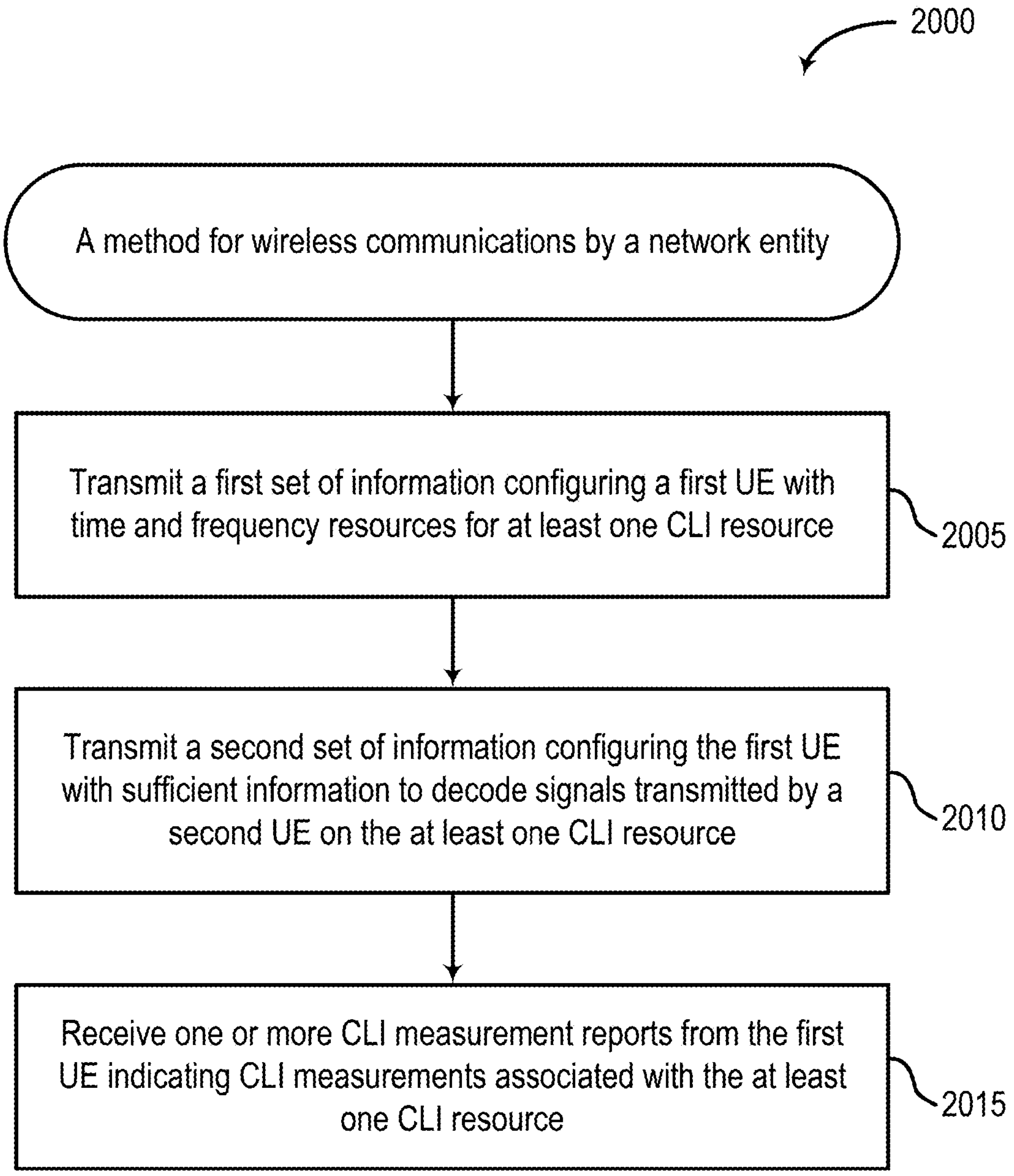
FIG. 20 depicts a method for wireless communications.

FIG. 20 shows a method 2000 for wireless communications by a network entity, such as BS 102 of FIGS. 1 and 3, or a disaggregated base station as discussed with respect to FIG. 2.

Method 2000 begins at 2005 with transmitting a first set of information configuring a first UE (e.g., a potential victim UE) with time and frequency resources for at least one CLI resource. In some cases, the operations of this step refer to, or may be performed by, CLI resource configuration circuitry as described with reference to FIG. 24.

Method 2000 then proceeds to step 2010 with transmitting a second set of information configuring the first UE with sufficient information to decode signals transmitted by a second UE (e.g., a potential aggressor UE) on the at least one CLI resource. In some cases, the operations of this step refer to, or may be performed by, UE information configuration circuitry as described with reference to FIG. 24.

Method 2000 then proceeds to step 2015 with receiving one or more CLI measurement reports from the first UE indicating CLI measurements associated with the at least one CLI resource. In some cases, the operations of this step refer to, or may be performed by, CLI report reception circuitry as described with reference to FIG. 24.

In some aspects, the network entity transmits the second set of information after a time period in which the first UE is expected to have completed sampling the signals transmitted by the second UE on the at least one CLI resource. In some aspects, the CLI measurement reports indicate RSRP measurements taken by the first UE after decoding the signals transmitted by the second UE on the at least one CLI resource.

Figure 24:
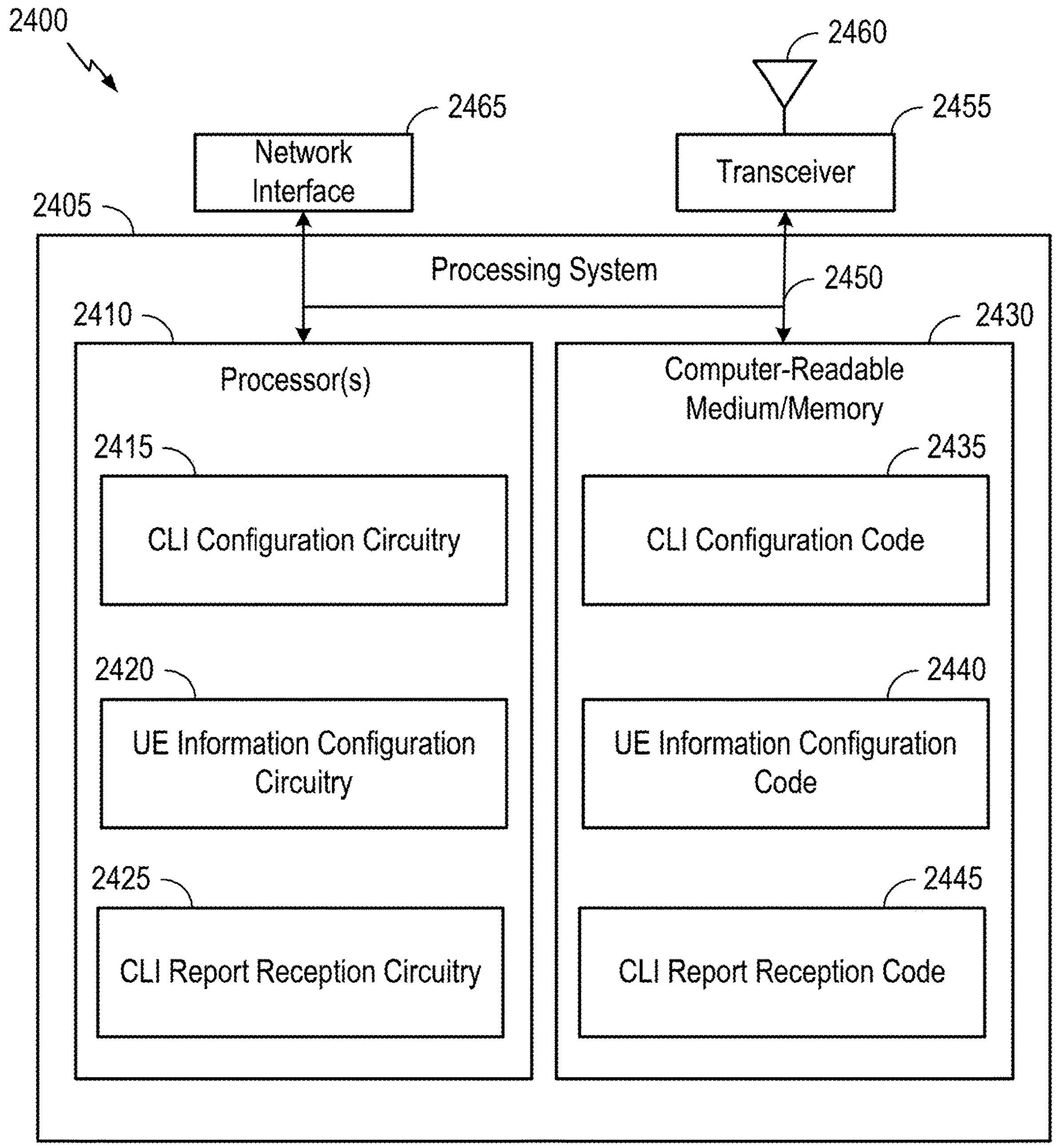
FIG. 24 depicts aspects of an example communications device.

In one aspect, method 2000, or any aspect related to it, may be performed by an apparatus, such as communications device 2400 of FIG. 24, which includes various components operable, configured, or adapted to perform the method 2000. Communications device 2400 is described below in further detail.

Note that FIG. 20 is just one example of a method, and other methods including fewer, additional, or alternative steps are possible consistent with this disclosure.

Example Operations of User Equipment

Figure 21:
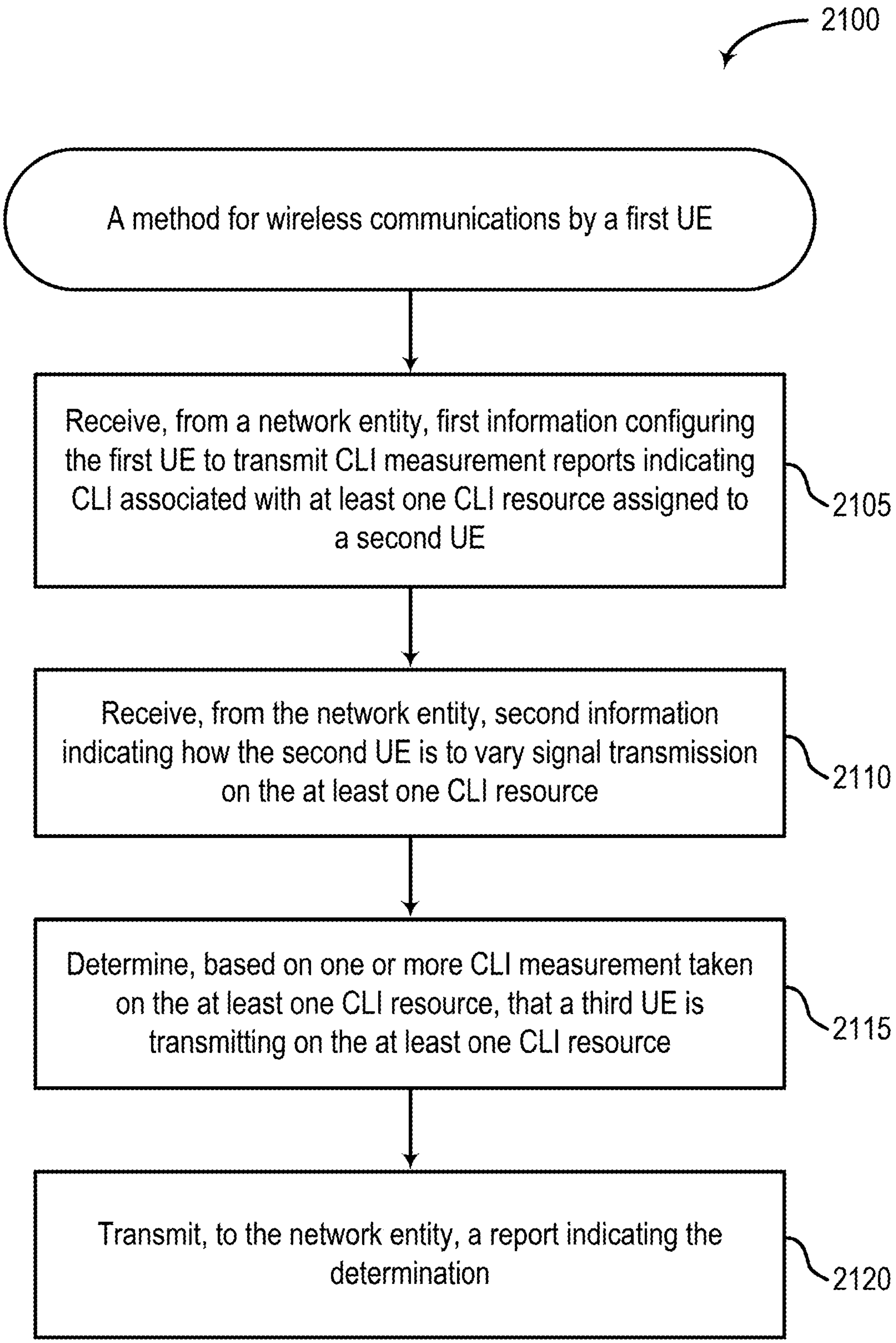
FIG. 21 depicts a method for wireless communications.

FIG. 21 shows a method 2100 for wireless communications by a first UE, such as UE 104 of FIGS. 1 and 3.

Method 2100 begins at 2105 with receiving, from a network entity, first information configuring the first UE (e.g. a potential victim UE) to transmit CLI measurement reports indicating CLI associated with at least one CLI resource assigned to a second UE (e.g., a potential aggressor UE). In some cases, the operations of this step refer to, or may be performed by, CLI report configuration circuitry as described with reference to FIG. 25.

Method 2100 then proceeds to step 2110 with receiving, from the network entity, second information indicating how the second UE is to vary signal transmission on the at least one CLI resource. In some cases, the operations of this step refer to, or may be performed by, CLI resource information processing circuitry as described with reference to FIG. 25.

Method 2100 then proceeds to step 2115 with determining, based on one or more CLI measurement taken on the at least one CLI resource, that a third UE (e.g., a hostile UE) is transmitting on the at least one CLI resource. In some cases, the operations of this step refer to, or may be performed by, CLI measurement processing circuitry as described with reference to FIG. 25.

Method 2100 then proceeds to step 2120 with transmitting, to the network entity, a report indicating the determination. In some cases, the operations of this step refer to, or may be performed by, reporting circuitry as described with reference to FIG. 25.

In some aspects, the second information indicates one or more silent periods during which the second UE is to refrain from transmitting signals on the at least one CLI resource. In some aspects, determining that the third UE is transmitting on the at least one CLI resource comprises determining that the CLI measurements indicate the third UE is transmitting on the at least one CLI resource during the one or more silent periods.

In some aspects, the second information configures the second UE to vary transmission power levels, when transmitting signals on the at least one CLI resource, according to a transmission power variation pattern. In some aspects, determining that the third UE is transmitting on the at least one CLI resource comprises determining the CLI measurements indicate metrics different than expected if only the second UE were transmitting signals on the at least one CLI resource according to the transmission power variation pattern.

In some aspects, the first information includes at least one bit indicating how the first UE is to perform CLI measurement reports.

Figure 25:
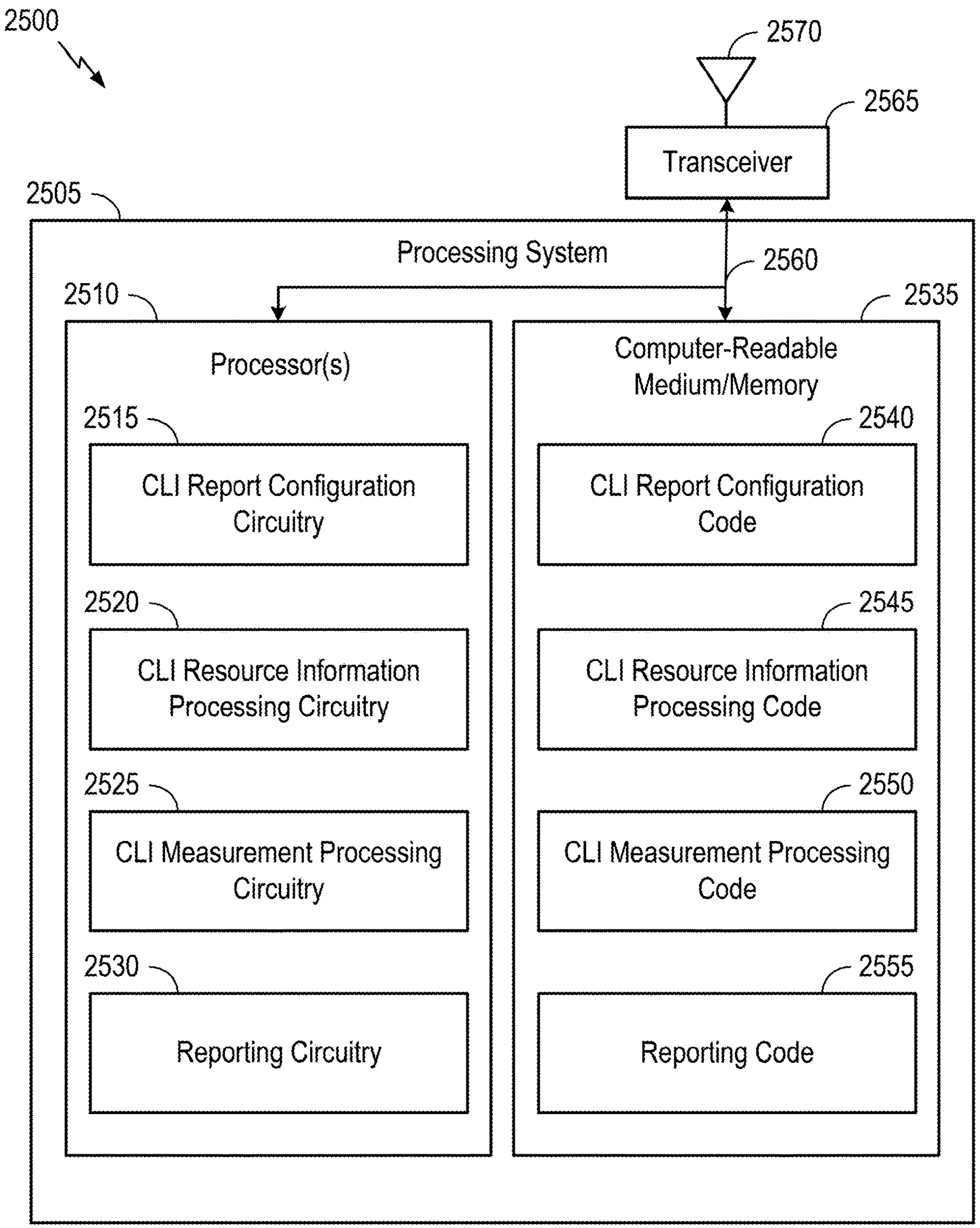
FIG. 25 depicts aspects of an example communications device.

In one aspect, method 2100, or any aspect related to it, may be performed by an apparatus, such as communications device 2500 of FIG. 25, which includes various components operable, configured, or adapted to perform the method 2100. Communications device 2500 is described below in further detail.

Note that FIG. 21 is just one example of a method, and other methods including fewer, additional, or alternative steps are possible consistent with this disclosure.

Figure 22:
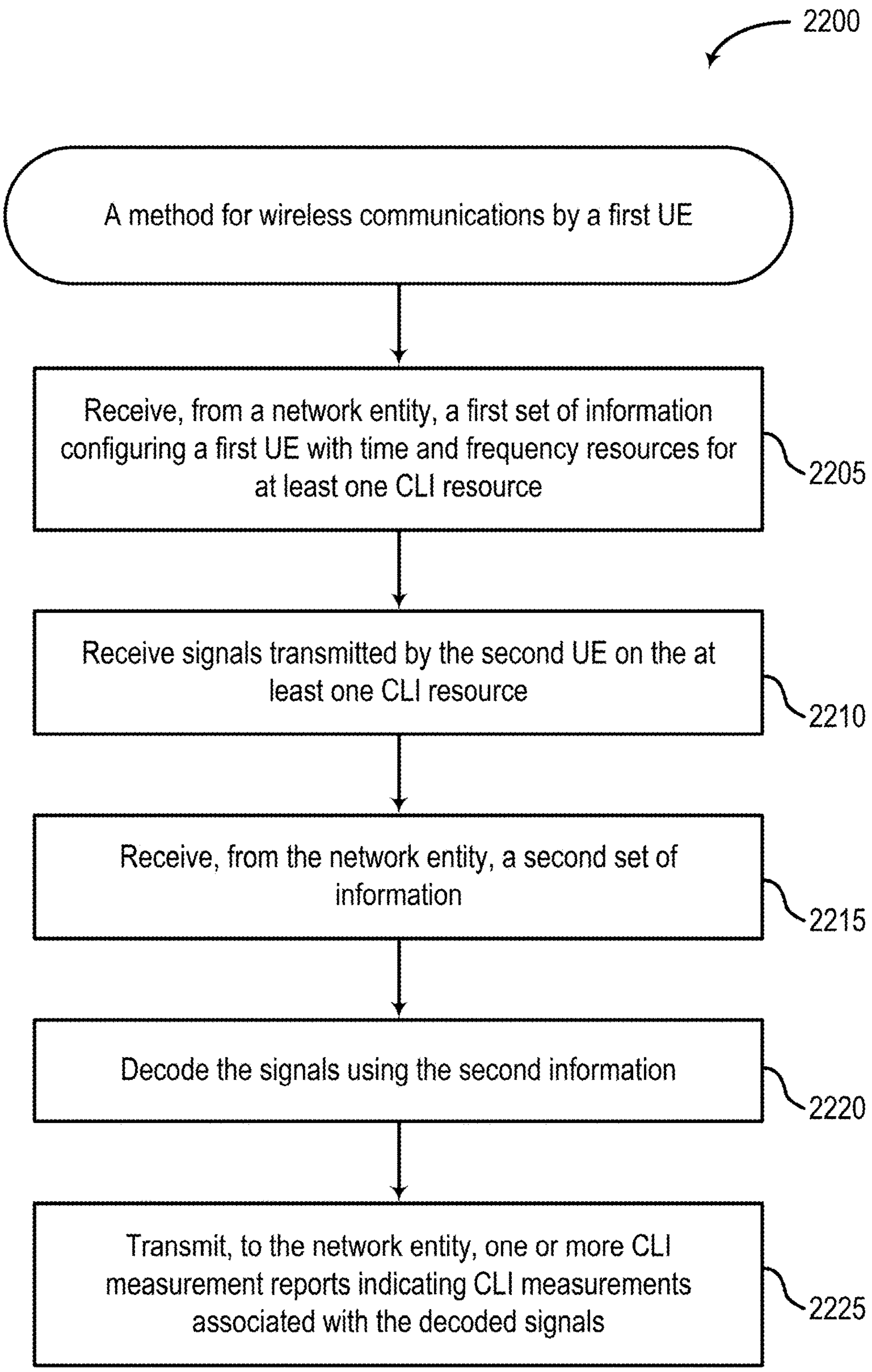
FIG. 22 depicts a method for wireless communications.

FIG. 22 shows a method 2200 for wireless communications by a first UE, such as UE 104 of FIGS. 1 and 3.

Method 2200 begins at 2205 with receiving, from a network entity, a first set of information configuring a first UE (e.g., a potential victim UE) with time and frequency resources for at least one CLI resource. In some cases, the operations of this step refer to, or may be performed by, CLI resource configuration circuitry as described with reference to FIG. 26.

Method 2200 then proceeds to step 2210 with receiving signals transmitted by a second UE (e.g., a potential aggressor UE) on the at least one CLI resource. In some cases, the operations of this step refer to, or may be performed by, reception circuitry as described with reference to FIG. 26.

Method 2200 then proceeds to step 2215 with receiving, from the network entity, a second set of information. In some cases, the operations of this step refer to, or may be performed by, reception circuitry as described with reference to FIG. 26.

Method 2200 then proceeds to step 2220 with decoding the signals using the second information. In some cases, the operations of this step refer to, or may be performed by, decoding circuitry as described with reference to FIG. 26.

Method 2200 then proceeds to step 2225 with transmitting, to the network entity, one or more CLI measurement reports indicating CLI measurements associated with the decoded signals. In some cases, the operations of this step refer to, or may be performed by, reporting circuitry as described with reference to FIG. 26.

In some aspects, the first UE receives the second set of information after a time period in which the first UE is expected to have completed sampling the signals transmitted by the second UE on the at least one CLI resource. In some aspects, the CLI measurement reports indicate RSRP measurements taken by the first UE after decoding the signals transmitted by the second UE on the at least one CLI resource.

Figure 26:
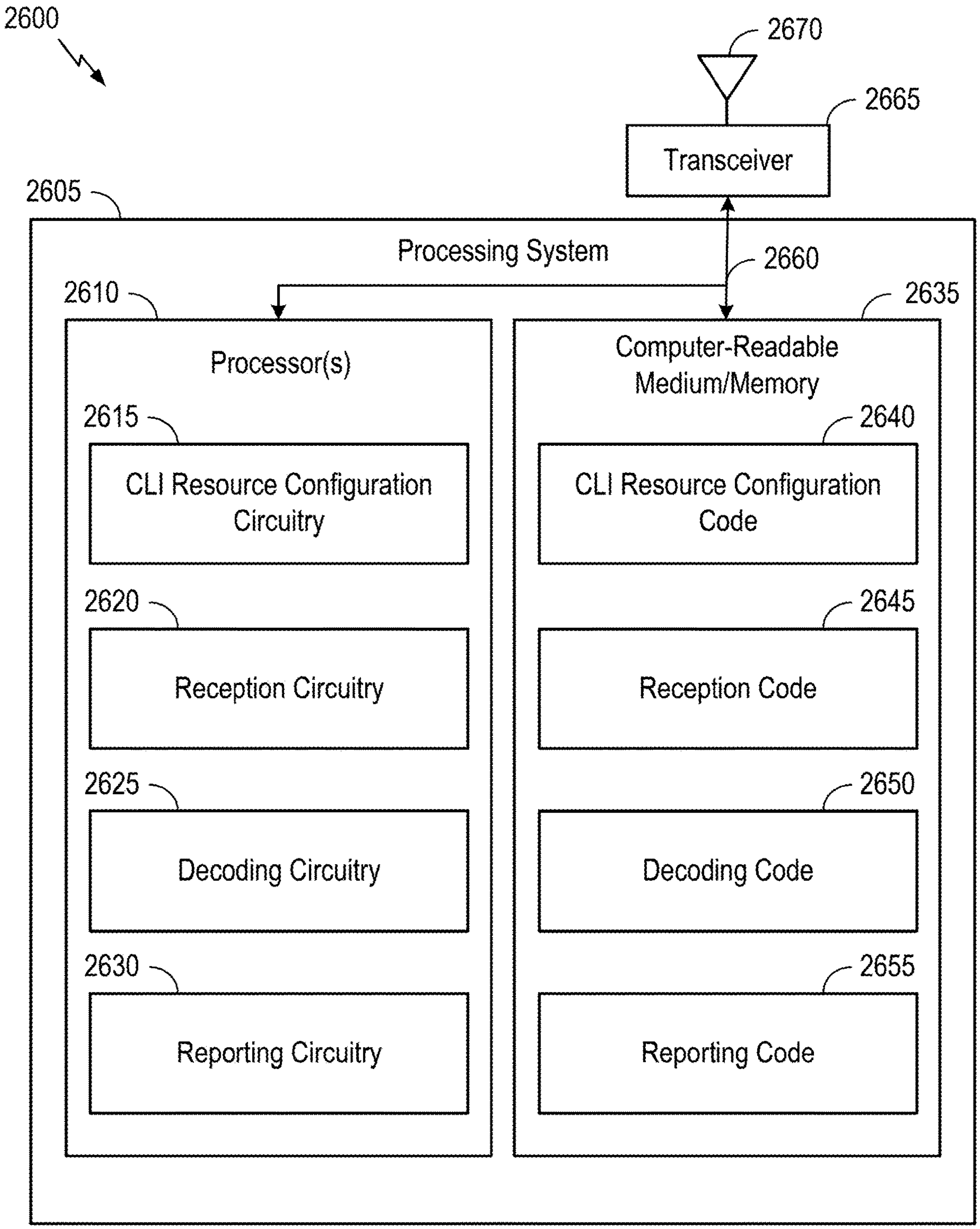
FIG. 26 depicts aspects of an example communications device.

In one aspect, method 2200, or any aspect related to it, may be performed by an apparatus, such as communications device 2600 of FIG. 26, which includes various components operable, configured, or adapted to perform the method 2200. Communications device 2600 is described below in further detail.

Note that FIG. 22 is just one example of a method, and other methods including fewer, additional, or alternative steps are possible consistent with this disclosure.

Example Communications Devices

FIG. 23 depicts aspects of an example communications device 2300. In some aspects, communications device 2300 is a network entity, such as BS 102 of FIGS. 1 and 3, or a disaggregated base station as discussed with respect to FIG. 2.

The communications device 2300 includes a processing system 2305 coupled to the transceiver 2355 (e.g., a transmitter and/or a receiver) and/or a network interface 2365. The transceiver 2355 is configured to transmit and receive signals for the communications device 2300 via the antenna 2360, such as the various signals as described herein. The network interface 2365 is configured to obtain and send signals for the communications device 2300 via communication link(s), such as a backhaul link, midhaul link, and/or fronthaul link as described herein, such as with respect to FIG. 2. The processing system 2305 may be configured to perform processing functions for the communications device 2300, including processing signals received and/or to be transmitted by the communications device 2300.

The processing system 2305 includes one or more processors 2310. In various aspects, one or more processors 2310 may be representative of one or more of receive processor 338, transmit processor 320, TX MIMO processor 330, and/or controller/processor 340, as described with respect to FIG. 3. The one or more processors 2310 are coupled to a computer-readable medium/memory 2330 via a bus 2350. In certain aspects, the computer-readable medium/memory 2330 is configured to store instructions (e.g., computer-executable code) that when executed by the one or more processors 2310, cause the one or more processors 2310 to perform the method 1900 described with respect to FIG. 19, or any aspect related to it. Note that reference to a processor of communications device 2300 performing a function may include one or more processors 2310 of communications device 2300 performing that function.

In the depicted example, the computer-readable medium/memory 2330 stores code (e.g., executable instructions), such as UE configuration code 2335, CLI report processing code 2340, and UE information processing code 2345. Processing of the UE configuration code 2335, CLI report processing code 2340, and UE information processing code 2345 may cause the communications device 2300 to perform the method 1900 described with respect to FIG. 19, or any aspect related to it.

The one or more processors 2310 include circuitry configured to implement (e.g., execute) the code stored in the computer-readable medium/memory 2330, including circuitry such as UE configuration circuitry 2315, CLI report processing circuitry 2320, and UE information processing circuitry 2325. Processing with UE configuration circuitry 2315, CLI report processing circuitry 2320, and UE information processing circuitry 2325 may cause the communications device 2300 to perform the method 1900 as described with respect to FIG. 19, or any aspect related to it.

Various components of the communications device 2300 may provide means for performing the method 1900 as described with respect to FIG. 19, or any aspect related to it. Means for transmitting, sending or outputting for transmission may include transceivers 332 and/or antenna(s) 334 of the BS 102 illustrated in FIG. 3 and/or the transceiver 2355 and the antenna 2360 of the communications device 2300 in FIG. 23. Means for receiving or obtaining may include transceivers 332 and/or antenna(s) 334 of the BS 102 illustrated in FIG. 3 and/or the transceiver 2355 and the antenna 2360 of the communications device 2300 in FIG. 23.

According to some aspects, UE configuration circuitry 2315 transmits first information configuring a first UE to transmit CLI measurement reports indicating CLI associated with at least one CLI resource assigned to a second UE. In some examples, UE configuration circuitry 2315 transmits second information configuring the second UE to vary signal transmission on the at least one CLI resource. According to some aspects, CLI report processing circuitry 2320 determines, based on one or more CLI measurement reports received from the first UE, that a third UE is transmitting on the at least one CLI resource.

In some aspects, the second information configures the second UE to refrain from transmitting signals on the at least one CLI resource during one or more silent periods. In some aspects, determining that the third UE is transmitting on the at least one CLI resource comprises determining that the CLI measurement reports indicate the third UE is transmitting on the at least one CLI resource during the one or more silent periods. In some aspects, the CLI measurement reports indicate transmission on the at least one CLI resource during the one or more silent periods by including a resource index corresponding to the at least one CLI resource.

According to some aspects, after determining that the third UE is transmitting on the at least one CLI resource, UE information processing circuitry 2325 estimates a position of the third UE based on proximity of the third UE to the second UE. In some examples, UE information processing circuitry 2325 identifies the third UE based on the estimated position of the third UE. In some aspects, the second information configures the second UE to vary transmission power levels, when transmitting signals on the at least one CLI resource, according to a transmission power variation pattern. In some aspects, determining that the third UE is transmitting on the at least one CLI resource comprises determining the CLI measurement reports indicate metrics different than expected if only the second UE were transmitting signals on the at least one CLI resource according to the transmission power variation pattern.

In some examples, CLI report processing circuitry 2320 receives an indication of the transmission power variation pattern from the second UE before determining the CLI measurement reports indicate metrics different than expected if only the second UE were transmitting signals on the at least one CLI resource according to the transmission power variation pattern. In some aspects, the CLI measurement reports include binary indications, each indicating whether the first UE detected CLI associated with the at least one CLI resource during a corresponding measurement period. In some aspects, determining that the third UE is transmitting on the at least one CLI resource comprises determining the CLI measurement reports indicate binary indications different than binary indications expected if only the second UE, configured according to the second information, were transmitting on the at least one CLI resource. In some aspects, the CLI measurement reports include a sequence of indices, each index representing a relative power level of CLI measured by the first UE on the at least one CLI resource during a corresponding measurement period. In some aspects, determining that the third UE is transmitting on the at least one CLI resource comprises determining the CLI measurement reports indicate a sequence of indices different than expected if only the second UE were transmitting on the at least one CLI resource while varying signal transmission on the at least one CLI resource according to the second information. In some aspects, the first information includes at least one bit indicating how the first UE is to perform CLI measurement reports.

In some examples, before determining that the third UE is transmitting on the at least one CLI resource, UE configuration circuitry 2315 transmits the second information to the first UE. In some aspects, determining that the third UE is transmitting on the at least one CLI resource is based on an explicit indication in the CLI measurement reports that the third UE is transmitting on the at least one CLI resource.

FIG. 24 depicts aspects of an example communications device 2400. In some aspects, communications device 2400 is a network entity, such as BS 102 of FIGS. 1 and 3, or a disaggregated base station as discussed with respect to FIG. 2.

The communications device 2400 includes a processing system 2405 coupled to the transceiver 2455 (e.g., a transmitter and/or a receiver) and/or a network interface 2465. The transceiver 2455 is configured to transmit and receive signals for the communications device 2400 via the antenna 2460, such as the various signals as described herein. The network interface 2465 is configured to obtain and send signals for the communications device 2400 via communication link(s), such as a backhaul link, midhaul link, and/or fronthaul link as described herein, such as with respect to FIG. 2. The processing system 2405 may be configured to perform processing functions for the communications device 2400, including processing signals received and/or to be transmitted by the communications device 2400.

The processing system 2405 includes one or more processors 2410. In various aspects, one or more processors 2410 may be representative of one or more of receive processor 338, transmit processor 320, TX MIMO processor 330, and/or controller/processor 340, as described with respect to FIG. 3. The one or more processors 2410 are coupled to a computer-readable medium/memory 2430 via a bus 2450. In certain aspects, the computer-readable medium/memory 2430 is configured to store instructions (e.g., computer-executable code) that when executed by the one or more processors 2410, cause the one or more processors 2410 to perform the method 2000 described with respect to FIG. 20, or any aspect related to it. Note that reference to a processor of communications device 2400 performing a function may include one or more processors 2410 of communications device 2400 performing that function.

In the depicted example, the computer-readable medium/memory 2430 stores code (e.g., executable instructions), such as CLI resource configuration code 2435, UE information configuration code 2440, and CLI report reception code 2445. Processing of the CLI resource configuration code 2435, UE information configuration code 2440, and CLI report reception code 2445 may cause the communications device 2400 to perform the method 2000 described with respect to FIG. 20, or any aspect related to it.

The one or more processors 2410 include circuitry configured to implement (e.g., execute) the code stored in the computer-readable medium/memory 2430, including circuitry such as CLI resource configuration circuitry 2415, UE information configuration circuitry 2420, and CLI report reception circuitry 2425. Processing with CLI resource configuration circuitry 2415, UE information configuration circuitry 2420, and CLI report reception circuitry 2425 may cause the communications device 2400 to perform the method 2000 as described with respect to FIG. 20, or any aspect related to it.

Various components of the communications device 2400 may provide means for performing the method 2000 as described with respect to FIG. 20, or any aspect related to it. Means for transmitting, sending or outputting for transmission may include transceivers 332 and/or antenna(s) 334 of the BS 102 illustrated in FIG. 3 and/or the transceiver 2455 and the antenna 2460 of the communications device 2400 in FIG. 24. Means for receiving or obtaining may include transceivers 332 and/or antenna(s) 334 of the BS 102 illustrated in FIG. 3 and/or the transceiver 2455 and the antenna 2460 of the communications device 2400 in FIG. 24.

According to some aspects, CLI resource configuration circuitry 2415 transmits a first set of information configuring a first UE with time and frequency resources for at least one CLI resource. According to some aspects, UE information configuration circuitry 2420 transmits a second set of information configuring the first UE with sufficient information to decode signals transmitted by a second UE on the at least one CLI resource. According to some aspects, CLI report reception circuitry 2425 receives one or more CLI measurement reports from the first UE indicating CLI measurements associated with the at least one CLI resource.

In some aspects, the network entity transmits the second set of information after a time period in which the first UE is expected to have completed sampling the signals transmitted by the second UE on the at least one CLI resource. In some aspects, the CLI measurement reports indicate RSRP measurements taken by the first UE after decoding the signals transmitted by the second UE on the at least one CLI resource.

FIG. 25 depicts aspects of an example communications device 2500. In some aspects, communications device 2500 is a first user equipment, such as UE 104 described above with respect to FIGS. 1 and 3.

The communications device 2500 includes a processing system 2505 coupled to the transceiver 2565 (e.g., a transmitter and/or a receiver). The transceiver 2565 is configured to transmit and receive signals for the communications device 2500 via the antenna 2570, such as the various signals as described herein. The processing system 2505 may be configured to perform processing functions for the communications device 2500, including processing signals received and/or to be transmitted by the communications device 2500.

The processing system 2505 includes one or more processors 2510. In various aspects, the one or more processors 2510 may be representative of one or more of receive processor 358, transmit processor 364, TX MIMO processor 366, and/or controller/processor 380, as described with respect to FIG. 3. The one or more processors 2510 are coupled to a computer-readable medium/memory 2535 via a bus 2560. In certain aspects, the computer-readable medium/memory 2535 is configured to store instructions (e.g., computer-executable code) that when executed by the one or more processors 2510, cause the one or more processors 2510 to perform the method 2100 described with respect to FIG. 21, or any aspect related to it. Note that reference to a processor performing a function of communications device 2500 may include one or more processors 2510 performing that function of communications device 2500.

In the depicted example, computer-readable medium/memory 2535 stores code (e.g., executable instructions), such as CLI report configuration code 2540, CLI resource information processing code 2545, CLI measurement processing code 2550, and reporting code 2555. Processing of the CLI report configuration code 2540, CLI resource information processing code 2545, CLI measurement processing code 2550, and reporting code 2555 may cause the communications device 2500 to perform the method 2100 described with respect to FIG. 21, or any aspect related to it.

The one or more processors 2510 include circuitry configured to implement (e.g., execute) the code stored in the computer-readable medium/memory 2535, including circuitry such as CLI report configuration circuitry 2515, CLI resource information processing circuitry 2520, CLI measurement processing circuitry 2525, and reporting circuitry 2530. Processing with CLI report configuration circuitry 2515, CLI resource information processing circuitry 2520, CLI measurement processing circuitry 2525, and reporting circuitry 2530 may cause the communications device 2500 to perform the method 2100 described with respect to FIG. 21, or any aspect related to it.

Various components of the communications device 2500 may provide means for performing the method 2100 described with respect to FIG. 21, or any aspect related to it. For example, means for transmitting, sending or outputting for transmission may include transceivers 354 and/or antenna(s) 352 of the UE 104 illustrated in FIG. 3 and/or the transceiver 2565 and the antenna 2570 of the communications device 2500 in FIG. 25. Means for receiving or obtaining may include transceivers 354 and/or antenna(s) 352 of the UE 104 illustrated in FIG. 3 and/or the transceiver 2565 and the antenna 2570 of the communications device 2500 in FIG. 25.

According to some aspects, CLI report configuration circuitry 2515 receives, from a network entity, first information configuring the first UE to transmit CLI measurement reports indicating CLI associated with at least one CLI resource assigned to a second UE. According to some aspects, CLI resource information processing circuitry 2520 receives, from the network entity, second information indicating how the second UE is to vary signal transmission on the at least one CLI resource. According to some aspects, CLI measurement processing circuitry 2525 determines, based on one or more CLI measurement taken on the at least one CLI resource, that a third UE is transmitting on the at least one CLI resource. According to some aspects, reporting circuitry 2530 transmits, to the network entity, a report indicating the determination.

In some aspects, the second information indicates one or more silent periods during which the second UE is to refrain from transmitting signals on the at least one CLI resource. In some aspects, determining that the third UE is transmitting on the at least one CLI resource comprises determining that the CLI measurements indicate the third UE is transmitting on the at least one CLI resource during the one or more silent periods. In some aspects, the second information configures the second UE to vary transmission power levels, when transmitting signals on the at least one CLI resource, according to a transmission power variation pattern. In some aspects, determining that the third UE is transmitting on the at least one CLI resource comprises determining the CLI measurements indicate metrics different than expected if only the second UE were transmitting signals on the at least one CLI resource according to the transmission power variation pattern. In some aspects, the first information includes at least one bit indicating how the first UE is to perform CLI measurement reports.

FIG. 26 depicts aspects of an example communications device 2600. In some aspects, communications device 2600 is a first user equipment, such as UE 104 described above with respect to FIGS. 1 and 3.

The communications device 2600 includes a processing system 2605 coupled to the transceiver 2665 (e.g., a transmitter and/or a receiver). The transceiver 2665 is configured to transmit and receive signals for the communications device 2600 via the antenna 2670, such as the various signals as described herein. The processing system 2605 may be configured to perform processing functions for the communications device 2600, including processing signals received and/or to be transmitted by the communications device 2600.

The processing system 2605 includes one or more processors 2610. In various aspects, the one or more processors 2610 may be representative of one or more of receive processor 358, transmit processor 364, TX MIMO processor 366, and/or controller/processor 380, as described with respect to FIG. 3. The one or more processors 2610 are coupled to a computer-readable medium/memory 2635 via a bus 2660. In certain aspects, the computer-readable medium/memory 2635 is configured to store instructions (e.g., computer-executable code) that when executed by the one or more processors 2610, cause the one or more processors 2610 to perform the method 2200 described with respect to FIG. 22, or any aspect related to it. Note that reference to a processor performing a function of communications device 2600 may include one or more processors 2610 performing that function of communications device 2600.

In the depicted example, computer-readable medium/memory 2635 stores code (e.g., executable instructions), such as CLI resource configuration code 2640, reception code 2645, decoding code 2650, and reporting code 2655. Processing of the CLI resource configuration code 2640, reception code 2645, decoding code 2650, and reporting code 2655 may cause the communications device 2600 to perform the method 2200 described with respect to FIG. 22, or any aspect related to it.

The one or more processors 2610 include circuitry configured to implement (e.g., execute) the code stored in the computer-readable medium/memory 2635, including circuitry such as CLI resource configuration circuitry 2615, reception circuitry 2620, decoding circuitry 2625, and reporting circuitry 2630. Processing with CLI resource configuration circuitry 2615, reception circuitry 2620, decoding circuitry 2625, and reporting circuitry 2630 may cause the communications device 2600 to perform the method 2200 described with respect to FIG. 22, or any aspect related to it.

Various components of the communications device 2600 may provide means for performing the method 2200 described with respect to FIG. 22, or any aspect related to it. For example, means for transmitting, sending or outputting for transmission may include transceivers 354 and/or antenna(s) 352 of the UE 104 illustrated in FIG. 3 and/or the transceiver 2665 and the antenna 2670 of the communications device 2600 in FIG. 26. Means for receiving or obtaining may include transceivers 354 and/or antenna(s) 352 of the UE 104 illustrated in FIG. 3 and/or the transceiver 2665 and the antenna 2670 of the communications device 2600 in FIG. 26.

According to some aspects, CLI resource configuration circuitry 2615 receives, from a network entity, a first set of information configuring a first UE with time and frequency resources for at least one CLI resource. According to some aspects, reception circuitry 2620 receives signals transmitted by the second UE on the at least one CLI resource. In some examples, reception circuitry 2620 receives, from the network entity, a second set of information. According to some aspects, decoding circuitry 2625 decodes the signals using the second information. According to some aspects, reporting circuitry 2630 transmits, to the network entity, one or more CLI measurement reports indicating CLI measurements associated with the decoded signals.

In some aspects, the first UE receives the second set of information after a time period in which the first UE is expected to have completed sampling the signals transmitted by the second UE on the at least one CLI resource. In some aspects, the CLI measurement reports indicate RSRP measurements taken by the first UE after decoding the signals transmitted by the second UE on the at least one CLI resource.

Example Clauses

Implementation examples are described in the following numbered clauses:

Clause 1: A method for wireless communication by a network entity, comprising: transmitting first information configuring a first UE to transmit CLI measurement reports indicating CLI associated with at least one CLI resource assigned to a second UE; transmitting second information configuring the second UE to vary signal transmission on the at least one CLI resource; and determining, based on one or more CLI measurement reports received from the first UE, that a third UE is transmitting on the at least one CLI resource.

Clause 2: The method of Clause 1, wherein the second information configures the second UE to refrain from transmitting signals on the at least one CLI resource during one or more silent periods.

Clause 3: The method of Clause 2, wherein determining that the third UE is transmitting on the at least one CLI resource comprises determining that the CLI measurement reports indicate the third UE is transmitting on the at least one CLI resource during the one or more silent periods.

Clause 4: The method of Clause 3, wherein the CLI measurement reports indicate transmission on the at least one CLI resource during the one or more silent periods by including a resource index corresponding to the at least one CLI resource.

Clause 5: The method of Clause 3, further comprising, after determining that the third UE is transmitting on the at least one CLI resource: estimating a position of the third UE based on proximity of the third UE to the second UE.

Clause 6: The method of Clause 5, further comprising: identifying the third UE based on the estimated position of the third UE.

Clause 7: The method of any one of Clauses 1-6, wherein the second information configures the second UE to vary transmission power levels, when transmitting signals on the at least one CLI resource, according to a transmission power variation pattern.

Clause 8: The method of Clause 7, wherein determining that the third UE is transmitting on the at least one CLI resource comprises determining the CLI measurement reports indicate metrics different than expected if only the second UE were transmitting signals on the at least one CLI resource according to the transmission power variation pattern.

Clause 9: The method of Clause 7, further comprising: receiving an indication of the transmission power variation pattern from the second UE before determining the CLI measurement reports indicate metrics different than expected if only the second UE were transmitting signals on the at least one CLI resource according to the transmission power variation pattern.

Clause 10: The method of any one of Clauses 1-9, wherein: the CLI measurement reports include binary indications, each indicating whether the first UE detected CLI associated with the at least one CLI resource during a corresponding measurement period; and determining that the third UE is transmitting on the at least one CLI resource comprises determining the CLI measurement reports indicate binary indications different than binary indications expected if only the second UE, configured according to the second information, were transmitting on the at least one CLI resource.

Clause 11: The method of any one of Clauses 1-10, wherein: the CLI measurement reports include a sequence of indices, each index representing a relative power level of CLI measured by the first UE on the at least one CLI resource during a corresponding measurement period; and determining that the third UE is transmitting on the at least one CLI resource comprises determining the CLI measurement reports indicate a sequence of indices different than expected if only the second UE were transmitting on the at least one CLI resource while varying signal transmission on the at least one CLI resource according to the second information.

Clause 12: The method of any one of Clauses 1-11, wherein the first information includes at least one bit indicating how the first UE is to perform CLI measurement reports.

Clause 13: The method of any one of Clauses 1-12, further comprising, before determining that the third UE is transmitting on the at least one CLI resource: transmitting the second information to the first UE.

Clause 14: The method of Clause 13, wherein determining that the third UE is transmitting on the at least one CLI resource is based on an explicit indication in the CLI measurement reports that the third UE is transmitting on the at least one CLI resource.

Clause 15: A method for wireless communication by a first UE, comprising: receiving, from a network entity, first information configuring the first UE to transmit CLI measurement reports indicating CLI associated with at least one CLI resource assigned to a second UE; receiving, from the network entity, second information indicating how the second UE is to vary signal transmission on the at least one CLI resource; determining, based on one or more CLI measurement taken on the at least one CLI resource, that a third UE is transmitting on the at least one CLI resource; and transmitting, to the network entity, a report indicating determination.

Clause 16: The method of Clause 15, wherein the second information indicates one or more silent periods during which the second UE is to refrain from transmitting signals on the at least one CLI resource.

Clause 17: The method of Clause 16, wherein determining that the third UE is transmitting on the at least one CLI resource comprises determining that the CLI measurements indicate the third UE is transmitting on the at least one CLI resource during the one or more silent periods.

Clause 18: The method of any one of Clauses 15-17, wherein the second information configures the second UE to vary transmission power levels, when transmitting signals on the at least one CLI resource, according to a transmission power variation pattern.

Clause 19: The method of Clause 18, wherein determining that the third UE is transmitting on the at least one CLI resource comprises determining the CLI measurements indicate metrics different than expected if only the second UE were transmitting signals on the at least one CLI resource according to the transmission power variation pattern.

Clause 20: The method of any one of Clauses 15-19, wherein the first information includes at least one bit indicating how the first UE is to perform CLI measurement reports.

Clause 21: A method for wireless communication by a network entity, comprising: transmitting a first set of information configuring a first UE with time and frequency resources for at least one CLI resource; transmitting a second set of information configuring the first UE with sufficient information to decode signals transmitted by a second UE on the at least one CLI resource; and receiving one or more CLI measurement reports from the first UE indicating CLI measurements associated with the at least one CLI resource.

Clause 22: The method of Clause 21, wherein the network entity transmits the second set of information after a time period in which the first UE is expected to have completed sampling the signals transmitted by the second UE on the at least one CLI resource.

Clause 23: The method of any one of Clauses 21 and 22, wherein the CLI measurement reports indicate RSRP measurements taken by the first UE after decoding the signals transmitted by the second UE on the at least one CLI resource.

Clause 24: A method for wireless communication by a first UE, comprising: receiving, from a network entity, a first set of information configuring a first UE with time and frequency resources for at least one CLI resource; receiving signals transmitted by the second UE on the at least one CLI resource; receiving, from the network entity, a second set of information; decoding the signals using the second information; and transmitting, to the network entity, one or more CLI measurement reports indicating CLI measurements associated with the decoded signals.

Clause 25: The method of Clause 24, wherein the first UE receives the second set of information after a time period in which the first UE is expected to have completed sampling the signals transmitted by the second UE on the at least one CLI resource.

Clause 26: The method of any one of Clauses 24-25, wherein the CLI measurement reports indicate RSRP measurements taken by the first UE after decoding the signals transmitted by the second UE on the at least one CLI resource.

Clause 27: A processing system, comprising: a memory comprising computer-executable instructions; one or more processors configured to execute the computer-executable instructions and cause the processing system to perform a method in accordance with any one of Clauses 1-26.

Clause 28: A processing system, comprising means for performing a method in accordance with any one of Clauses 1-26.

Clause 29: A non-transitory computer-readable medium comprising computer-executable instructions that, when executed by one or more processors of a processing system, cause the processing system to perform a method in accordance with any one of Clauses 1-26.

Clause 30: A computer program product embodied on a computer-readable storage medium comprising code for performing a method in accordance with any one of Clauses 1-26.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A network entity for wireless communication, comprising one or more memories and one or more processors coupled to the one or more memories and configured to:

cause transmitting first information configuring a first user equipment (UE) to transmit cross-link interference (CLI) measurement reports indicating CLI associated with at least one CLI resource assigned to a second UE;

cause transmitting second information configuring the second UE to vary signal transmission on the at least one CLI resource; and determine, based on one or more CLI measurement reports received from the first UE, that a third UE is transmitting on the at least one CLI resource;

wherein: the CLI measurement reports include binary indications, each indicating whether the first UE detected CLI associated with the at least one CLI resource during a corresponding measurement period; and to determine that the third UE is transmitting on the at least one CLI resource, the one or more processors are configured to determine the CLI measurement reports indicate binary indications different than binary indications expected only the second UE, configured according to the second information, were transmitting on the at least one CLI resource.

2. The network entity of claim 1, wherein the second information configures the second UE to refrain from transmitting signals on the at least one CLI resource during one or more silent periods.

3. The network entity of claim 2, wherein to determine that the third UE is transmitting on the at least one CLI resource, the one or more processors are configured to determine that the CLI measurement reports indicate the third UE is transmitting on the at least one CLI resource during the one or more silent periods.

4. The network entity of claim 3, wherein the CLI measurement reports indicate transmission on the at least one CLI resource during the one or more silent periods by including a resource index corresponding to the at least one CLI resource.

5. The network entity of claim 3, wherein the one or more processors are further configured, after determining that the third UE is transmitting on the at least one CLI resource to estimate a position of the third UE based on proximity of the third UE to the second UE.

6. The network entity of claim 5, wherein the one or more processors are further configured to identify the third UE based on the estimated position of the third UE.

7. The network entity of claim 1, wherein the second information configures the second UE to vary transmission power levels, when transmitting signals on the at least one CLI resource, according to a transmission power variation pattern.

8. The network entity of claim 7, wherein to determine that the third UE is transmitting on the at least one CLI resource, the one or more processors are configured to determine the CLI measurement reports indicate metrics different than expected if only the second UE were transmitting signals on the at least one CLI resource according to the transmission power variation pattern.

9. The network entity of claim 7, further comprising:

receiving an indication of the transmission power variation pattern from the second UE before determining the CLI measurement reports indicate metrics different than expected if only the second UE were transmitting signals on the at least one CLI resource according to the transmission power variation pattern.

10. The network entity of claim 1, wherein:

the CLI measurement reports include a sequence of indices, each index representing a relative power level of CLI measured by the first UE on the at least one CLI resource during a corresponding measurement period; and to determine that the third UE is transmitting on the at least one CLI resource, the one or more processors are configured to determine the CLI measurement reports indicate a sequence of indices different than expected if only the second UE were transmitting on the at least one CLI resource while varying signal transmission on the at least one CLI resource according to the second information.

11. The network entity of claim 1, wherein the first information includes at least one bit indicating how the first UE is to perform CLI measurement reports.

12. The network entity of claim 1, wherein the one or more processors are further configured, before determining that the third UE is transmitting on the at least one CLI resource, to cause transmitting the second information to the first UE.

13. The network entity of claim 12, wherein the one or more processors are configured to determine that the third UE is transmitting on the at least one CLI resource based on an explicit indication in the CLI measurement reports that the third UE is transmitting on the at least one CLI resource.

14. A first user equipment (UE) for wireless communication, comprising more processors coupled to the one or more memories and configured to:

cause receiving, from a network entity, first information configuring the first UE to transmit cross-link interference (CLI) measurement reports indicating CLI associated with at least one CLI resource assigned to a second UE;

cause receiving, from the network entity, second information indicating how the second UE is to vary signal transmission on the at least one CLI resource;

determine, based on one or more CLI measurement taken on the at least one CLI resource, that a third UE is transmitting on the at least one CLI resource; and cause transmitting, to the network entity, a report indicating the determination;

wherein: the CLI measurement reports include binary indications, each indicating whether the first UE detected CLI associated with the at least one CLI resource during a corresponding measurement period; and to determine that the third UE is transmitting on the at least one CLI resource, the one or more processors are configured to determine the CLI measurement reports indicate binary indications different than binary indications expected only the second UE, configured according to the second information, were transmitting on the at least one CLI resource.

15. The method first UE of claim 14, wherein the second information indicates one or more silent periods during which the second UE is to refrain from transmitting signals on the at least one CLI resource.

16. The method first UE of claim 15, wherein to determine that the third UE is transmitting on the at least one CLI resource, the one or more processors are configured to determine that the CLI measurements indicate the third UE is transmitting on the at least one CLI resource during the one or more silent periods.

17. The method first UE of claim 14, wherein the second information configures the second UE to vary transmission power levels, when transmitting signals on the at least one CLI resource, according to a transmission power variation pattern.

18. The method first UE of claim 17, wherein to determine that the third UE is transmitting on the at least one CLI resource, the one or more processors are configured to determine the CLI measurements indicate metrics different than expected if only the second UE were transmitting signals on the at least one CLI resource according to the transmission power variation pattern.

19. The method first UE of claim 14, wherein the first information includes at least one bit indicating how the first UE is to perform CLI measurement reports.

20. A network entity for wireless communication, comprising one or more memories and one or more processors coupled to the one or more memories and configured to:

cause transmitting a first set of information configuring a first user equipment (UE) with time and frequency resources for at least one cross-link interference (CLI) resource;

cause transmitting a second set of information configuring the first UE with sufficient information to decode signals transmitted by a second UE on the at least one CLI resource; and cause receiving one or more CLI measurement reports from the first UE indicating CLI measurements associated with the at least one CLI resource;

wherein: the CLI measurement reports include binary indications, each indicating whether the first UE detected CLI associated with the at least one CLI resource during a corresponding measurement period; and to determine that the third UE is transmitting on the at least one CLI resource, the one or more processors are configured to determine the CLI measurement reports indicate binary indications different than binary indications expected only the second UE, configured according to the second information, were transmitting on the at least one CLI resource.

21. The network entity of claim 20, wherein the the one or more processors are configured to cause transmitting the second set of information after a time period in which the first UE is expected to have completed sampling the signals transmitted by the second UE on the at least one CLI resource.

22. The network entity of claim 20, wherein the CLI measurement reports indicate reference signal received power (RSRP) measurements taken by the first UE after decoding the signals transmitted by the second UE on the at least one CLI resource.

23. A first user equipment (UE) for wireless communication, comprising one or more memories and one or more processors coupled to the one or more memories and configured to:

cause receiving, from a network entity, a first set of information configuring the first UE with time and frequency resources for at least one cross-link interference (CLI) resource;

cause receiving, from the network entity, a second set of information; decode the signals using the second set of information; and cause transmitting, to the network entity, one or more CLI measurement reports indicating CLI measurements associated with the decoded signals;

wherein: the CLI measurement reports include binary indications, each indicating whether the first UE detected CLI associated with the at least one CLI resource during a corresponding measurement period; and to determine that the third UE is transmitting on the at least one CLI resource, the one or more processors are configured to determine the CLI measurement reports indicate binary indications different than binary indications expected only the second UE, configured according to the second information, were transmitting on the at least one CLI resource.

24. The first UE of claim 23, wherein the one or more processors are configured to cause receiving the second set of information after a time period in which the first UE is expected to have completed sampling the signals transmitted by the second UE on the at least one CLI resource.

25. The method first UE of claim 23, wherein the CLI measurement reports indicate reference signal received power (RSRP) measurements taken by the first UE after decoding the signals transmitted by the second UE on the at least one CLI resource.

* * * * *